US010659507B2

(12) United States Patent
Lotfallah et al.

(10) Patent No.: US 10,659,507 B2
(45) Date of Patent: May 19, 2020

(54) INDICATION FOR PARTIAL SEGMENT

(71) Applicant: QUALCOMM Incorporated, San Diego, CA (US)

(72) Inventors: Osama Lotfallah, San Diego, CA (US); Carlos Marcelo Dias Pazos, Carlsbad, CA (US); Charles Nung Lo, San Diego, CA (US); Nagaraju Naik, San Diego, CA (US); Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 15/054,226

(22) Filed: Feb. 26, 2016

(65) Prior Publication Data

US 2016/0261663 A1   Sep. 8, 2016

Related U.S. Application Data

(60) Provisional application No. 62/204,505, filed on Aug. 13, 2015, provisional application No. 62/126,842, filed on Mar. 2, 2015.

(51) Int. Cl.
*H04L 29/08* (2006.01)
*H04W 28/04* (2009.01)
(Continued)

(52) U.S. Cl.
CPC ........ *H04L 65/601* (2013.01); *H04L 65/4084* (2013.01); *H04L 65/608* (2013.01);
(Continued)

(58) Field of Classification Search
CPC . H04L 65/601; H04L 65/4084; H04L 65/608; H04L 65/80; H04L 67/02; H04L 67/06; H04L 67/42; H04L 29/06136
(Continued)

(56) References Cited

U.S. PATENT DOCUMENTS 8,914,835 B2 * 12/2014 Chen ................ H04N 21/23439
725/105
9,235,636 B2 * 1/2016 Stein ................... G06F 16/3322
(Continued)

FOREIGN PATENT DOCUMENTS

CN      101043296 A    9/2007
CN      101477575 A    7/2009
(Continued)

OTHER PUBLICATIONS

3rd Generation Partnership Project; Technical Specification Group Services and System Aspects; Multimedia Broadcast/Multicast Service (MBMS) User Service Guidelines (Release 12), 3GPP Draft; 26946-C10, 3rd Generation Partnership Project (3GPP), Mobile Competence Centre; 650, Route Des Lucioles; F-06921 Sophia-Antipolis Cedex; France, Dec. 10, 2014, XP050907047, Retrieved from the Internet URL: http://www.3gpp.org/ftp/Specs/2014-12/Rel-12/26_Series/[retrieved on Dec. 10, 2014].
(Continued)

*Primary Examiner* — Kevin T Bates
*Assistant Examiner* — Golam Mahmud
(74) *Attorney, Agent, or Firm* — The Marbury Law Group, PLLC

(57) ABSTRACT

Systems, methods, and devices of the various embodiments enable HTTP servers, such as HTTP servers providing segments to DASH clients according to the various embodiments, to pass incomplete versions of segments in response to segment requests from the DASH clients. The various embodiments may enable clients, such as DASH clients, to parse incomplete versions of segments.

20 Claims, 18 Drawing Sheets

(51) Int. Cl.
 H04L 1/00 (2006.01)
 H04L 29/06 (2006.01)
 H04W 28/06 (2009.01)
(52) U.S. Cl.
 CPC .............. *H04L 65/80* (2013.01); *H04L 67/02* (2013.01); *H04L 67/06* (2013.01); *H04L 67/42* (2013.01)
(58) Field of Classification Search
 USPC ........................................................ 709/219
 See application file for complete search history.

(56) References Cited

U.S. PATENT DOCUMENTS

| | | | |
|---|---|---|---|
| 9,264,481 | B2 | 2/2016 | Walker et al. |
| 9,319,696 | B2* | 4/2016 | Wu .................. H04N 21/23424 |
| 9,521,439 | B1* | 12/2016 | Hsu ................ H04N 21/234345 |
| 9,769,230 | B2* | 9/2017 | Hannuksela ... H04N 21/234327 |
| 2005/0102371 | A1* | 5/2005 | Aksu ................ H04L 29/06027 709/217 |
| 2005/0144278 | A1 | 6/2005 | Atamaniouk |
| 2006/0271488 | A1* | 11/2006 | Maes .................... G06Q 20/085 705/52 |
| 2006/0272028 | A1* | 11/2006 | Maes ...................... G06Q 30/04 726/27 |
| 2010/0207873 | A1* | 8/2010 | Lee ....................... H04L 65/602 345/156 |
| 2010/0235528 | A1* | 9/2010 | Bocharov .......... H04N 21/6437 709/231 |
| 2010/0235542 | A1* | 9/2010 | Visharam ....... H04N 21/234354 709/246 |
| 2011/0317760 | A1* | 12/2011 | Chen .................... G11B 27/007 375/240.12 |
| 2012/0042090 | A1* | 2/2012 | Chen .................... H04L 65/604 709/231 |
| 2012/0155831 | A1 | 6/2012 | Uchida et al. |
| 2012/0259994 | A1 | 10/2012 | Gillies et al. |
| 2013/0083848 | A1* | 4/2013 | Joch ........................ H04N 19/40 375/240.12 |
| 2013/0110945 | A1 | 5/2013 | Tamiya |
| 2013/0191550 | A1* | 7/2013 | Hannuksela ... H04N 21/234327 709/231 |
| 2013/0254634 | A1 | 9/2013 | Luby et al. |
| 2013/0262567 | A1* | 10/2013 | Walker .................. H04L 69/329 709/203 |
| 2015/0012584 | A1* | 1/2015 | Lo ............................ H04L 67/02 709/203 |
| 2015/0086033 | A1* | 3/2015 | Tebbs ....................... H04L 65/60 381/77 |
| 2015/0172066 | A1* | 6/2015 | Gholmieh .............. H04L 12/189 370/312 |
| 2015/0207838 | A1* | 7/2015 | Gabin ................. H04L 65/4084 709/219 |
| 2016/0021164 | A1* | 1/2016 | Chakarapani ......... G06F 16/783 709/224 |
| 2016/0134915 | A1 | 5/2016 | Oran |
| 2016/0261664 | A1 | 9/2016 | Lotfallah et al. |
| 2016/0261677 | A1 | 9/2016 | Lotfallah et al. |
| 2017/0068992 | A1* | 3/2017 | Chen .................. G06Q 30/0269 |
| 2018/0098242 | A1* | 4/2018 | Thienot .............. H04L 65/4076 |
| 2019/0149573 | A1* | 5/2019 | Park .................... H04L 63/1458 726/22 |

FOREIGN PATENT DOCUMENTS

| | | |
|---|---|---|
| CN | 101751527 A | 6/2010 |
| CN | 102301679 A | 12/2011 |
| CN | 102771080 A | 11/2012 |
| CN | 103702065 A | 4/2014 |
| JP | 2014057227 A | 3/2014 |
| JP | 2015136060 A | 7/2015 |
| JP | 2018514108 A | 5/2018 |
| WO | 2013149144 A1 | 10/2013 |
| WO | 2014022234 A1 | 2/2014 |

OTHER PUBLICATIONS

International Search Report and Written Opinion—PCT/US2016/020083—ISA/EPO—dated May 12, 2016.

Qualcomm Incorporated et al., "Partial Segment Delivery Support," 3GPP Draft; S4-141196 CR 26 247-0068 Partial Segment Delivery (REL 12), 3rd Generation Partnership Project (3GPP), Mobile Competence Centre; 650, Route Des Lucioles; F-06921 Sophia-Antipolis Cedex; vol. SA WG4, Oct. 29, 2014, XP050892874, Retrieved from the Internet URL: http://www.3gpp.org/ftp/tsg_sa/WG4_CODEC/TSGS4_81/Docs/[retrieved on Oct. 29, 2014] the whole document.

Snell J: "Prefer Header for HT TP; rfc7240.txt," Prefer Header for Http; RFC7240.Txt, Internet Engineering Task Force, IETF; Standard, Internet Society (ISOC) 4, Rue Des Falaises CH-1205 Geneva, Switzerland, Jun. 7, 2014, pp. 1-17, XP015100697, [retrieved on Jun. 7, 2014].

"3rd Generation Partnership Project; Technical Specification Group Services and System Aspects; Multimedia Broadcast/Multicast Service (MBMS); Protocols and codecs (Release 13)", 3GPP TS 26.346 V13.3.0, Dec. 2015, 235 Pages.

3GPP TR 26.946: "3rd Generation Partnership Project; Technical Specification Group Services and System Aspects; Multimedia Broadcast/Multicast Service (MBMS) User Service Guidelines (Release 12)", V12.1.0, Dec. 2014, 48 Pages, Retrieved from the Internet: http://www.3gpp.org/ftp/tsg_sa/WG4_CODEC/Specs_update_after_SA67.

Hypertext Transfer Protocol (HTTP/1.1): Semantics and Content, RFC7231, IETF, Jun. 2014, pp. 38-39, 47-48 (publication showing well-known technology), 7 Pages.

Qualcomm Incorporated: "Guidelines on HTTP Redirection for DASH-over-MBMS Service with Unicast Fallback", 3GPP TSG-SA WG4 Meeting #81, S4-141197, 3GPP, Nov. 2014, 6 Pages.

* cited by examiner

INDICATION FOR PARTIAL SEGMENT

RELATED APPLICATIONS

The present application claims priority to U.S. Provisional Patent Application No. 62/126,842 entitled "Indication for Partial Segment" filed Mar. 2, 2015 and U.S. Provisional Patent Application No. 62/204,505 entitled "Indication for Partial Segment" filed Aug. 13, 2015. The entire contents of both applications are hereby incorporated by reference.

BACKGROUND

During network transport of digital files, such as video fragments or pieces that are sent in individual files called segments, various events or errors (e.g., tune-away, radio channel errors, etc.) can occur that result in only partial files being received. For example, current evolved Multimedia Broadcast Multicast Service (eMBMS) middleware on a computing device may only receive a partial Dynamic Adaptive Streaming Over Hypertext Transfer Protocol (DASH) segment rather than the entire segment. An application and/or a client providing inputs to a codec, such as a DASH client, may be enabled, under certain conditions, to recover and provide some portion of a file to the codec even though the file may not have been received by the application and/or client in its entirety. Because current applications and/or clients (e.g., current DASH clients) do not have a mechanism for indicating the current applications' and/or clients' ability to receive partial segments, partial segments may not be served to the application and/or client. For example, current eMBMS middleware on a computing device may drop partial segments, which may increase playback interruptions.

SUMMARY

The systems, methods, and devices of the various embodiments enable Hypertext Transfer Protocol (HTTP) servers, such as HTTP servers providing segments to DASH clients according to the various embodiments, to pass incomplete versions of segments in response to segment requests from the DASH clients. The various embodiments may enable clients, such as DASH clients, to parse incomplete versions of segments.

Various embodiments may include a computing device receiving an incomplete version of a media file in a response message. The response message may include an indication that the response message includes the incomplete version of the media file and an indication of an access position for the incomplete version of the media file. The computing device may determine whether a byte corresponding to the access position is received in the incomplete version of the media file. In response to determining that the byte corresponding to the access position is received in the incomplete version of the media file, the computing device may parse the incomplete version of the media file beginning at the byte corresponding to the access position. Some embodiments may further include the computing device determining whether an initial portion of a media file request is received in the incomplete version of the media file. In response to determining that the initial portion of the media file is receive in the incomplete version of the media file, the computing device may parse the incomplete version of the media file beginning at a first byte of the initial portion of the media file.

Further embodiments include a computing device with a processor configured with processor-executable instructions to perform operations of the methods summarized above. Further embodiments include a computing device having means for performing functions of the methods summarized above. Further embodiments include a non-transitory processor-readable storage medium having stored thereon processor-executable instructions configured to cause a computing device processor to perform operations of the methods summarized above

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
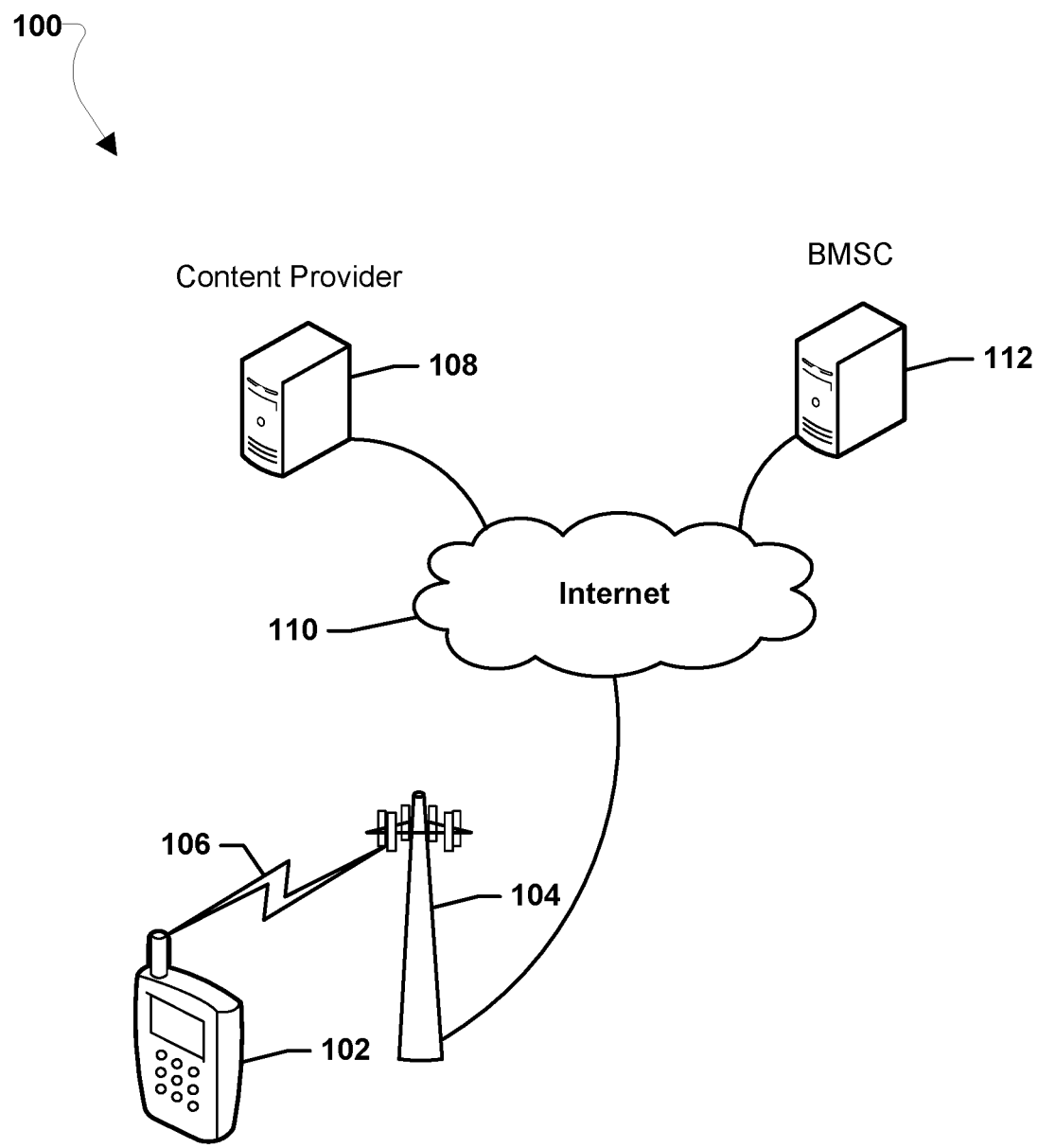
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments enable HTTP servers, such as DASH servers providing segments of DASH media files to DASH clients according to the various embodiments, to pass incomplete versions of segments in response to segment requests from the clients, such as DASH clients.

As used herein, the terms "mobile device", "receiver device", and "computing device" are used interchangeably herein to refer to any one or all of cellular telephones, smart phones, personal or mobile multi-media players, personal data assistants (PDAs), laptop computers, personal computers, tablet computers, smart books, palm-top computers, wireless electronic mail receivers, multimedia Internet enabled cellular telephones, wireless gaming controllers, satellite or cable set top boxes, streaming media players (such as, ROKU™ or CHROMECAST™ or FIRE TV™), smart televisions, digital video recorders (DVRs), and similar personal electronic devices which include a programmable processor and memory and circuitry for receiving files.

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

As used herein, the term "incomplete version of a segment" is used to refer to an incomplete version of a file that has missing and/or corrupted data portions. For example, if a segment includes 1,000 bytes indexed by 0-999 then bytes 0-888 of that segment is an incomplete version of that segment, and bytes 500-999 is another incomplete version of that segment, and bytes 0-200 together with bytes 300-999 is another incomplete version of that segment, whereas bytes 0-999 is not an incomplete version of that segment.

In the current Hypertext Transfer Protocol (HTTP) 1.1 defined in Internet Engineering Task Force proposed standard Request for Comments (RFC) 2616 entitled "Hypertext Transfer Protocol—HTTP/1.1" published June 1999, available at http://tools.ietf.org/html/rfc2616, there is no mechanism for servers to provide an incomplete version of a file (e.g., files that have missing/corrupted data portions) to clients in response to file requests. In the current HTTP protocol, a client may generate a file request, such as a "GET" method, and send the file request to a server. File requests may be requests for a file associated with a URL/URI, and may be requests for the entire data contents of a file associated with a URL/URI (e.g., using a GET request that doesn't specify any byte range and thus requests the complete file) or may be requests for specific byte ranges of a file associated with a URL/URI (e.g., using a partial GET request that specifies a byte range within the complete file).

In the current HTTP protocol, a server can provide a "full response" or an error message, in response to a client's file request. The HTTP server will not provide incomplete versions of a file in response to HTTP client file requests. For GET requests that request a complete file, a full response from the HTTP server is the complete file, and an incomplete version of a file response is anything less than the complete file (e.g., an incomplete version of a file). For partial GET requests that specify a byte range, a full response from the HTTP server is the intersection between the complete file and the requested byte range, and an incomplete version of a byte range response is anything less than the intersection between the complete file and the requested byte range (e.g., an incomplete version of a byte range).

In particular, in the current HTTP protocol, when a server receives a file request, the server may determine whether the file corresponding to the file request is fully available. As an example, the server may determine whether the file corresponding to the file request is incomplete and/or corrupted, such as missing data portions and/or including an indication that the file is incomplete and/or corrupted. As an example, the server may determine whether the file corresponding to the file request is incomplete and/or corrupted by determining whether FEC decoding was successful or unsuccessful. As another example, the server may determine whether the file corresponding to the file request is incomplete and/or corrupted by detecting a difference in a value of a received checksum, such as the MD5 digest, and a checksum computed by a FLUTE receiver. Those files that are not incomplete and/or corrupted may be determined by the server to be fully available and may be sent to the client in a "full response" that includes the requested file. In the current HTTP protocol, upon identifying that the requested file is not fully available (i.e., only an incomplete version of the file is available that has missing/corrupted data portions), the server merely returns a message with an error status code, such as a message with a 404 "Not Found" status code. Thus, in the current HTTP protocol, the incomplete version of a file is not sent to the requesting client; that is, an "incomplete response" to a request for a file is not supported.

As mentioned above, the current HTTP protocol also provides for partial GET requests, which specify a byte range for a requested file, and the full response to partial GET requests is the intersection between the complete file and the requested byte range. For example, in the current HTTP when an HTTP client sends a partial GET request for a byte range that extends beyond the end of a complete file, the full response that an HTTP server can provide is a sequential portion of bytes from the first byte in the requested byte range to the last byte of the complete file. Thus, in an example in which the requested byte range is 0-100, but the complete file has only bytes 0-88, the full response is less than the byte range requested (in particular, bytes 0-88), but it is considered a "full response" nonetheless and may be sent by the HTTP server.

However, in the current HTTP protocol, when an HTTP client sends a partial GET request and some of the bytes within the specified byte range are missing/corrupted (i.e., only an incomplete version of the byte range requested is available on the HTTP server), the HTTP server may not provide any portion of the requested bytes to the client, and instead sends the client a message with an error status code. Thus, in an example in which a requested byte range is 0-99, but only bytes 0-74 and 126-150 are available because bytes 75-125 are missing or corrupted, the current HTTP server will not send an incomplete version of the byte range response consisting of bytes 0-74 to the requesting client. Thus, in the current HTTP protocol, the incomplete version of a byte range request is not sent to the requesting client. This is because an "incomplete response" to a request for a byte range of a file is not supported.

Because the HTTP protocol as currently defined does not pass incomplete responses to a client, the functionality of clients and/or applications that are enabled to recover and use incomplete responses may be reduced because the clients and/or applications may never receive incomplete responses. Thus, it may be useful to enable HTTP servers to deliver to clients at least a portion of incomplete versions of files or incomplete versions of byte ranges of files that are available at the server. The delivery of at least a portion of the incomplete version of a file or byte range may enable client devices running an application and/or a client (e.g., as a smart phone running a DASH client) to render the content, such as playing back at least a portion of the media in the incomplete version of a segment or byte range of a segment, which may improve the end user media playback experience.

The various embodiments address this shortcoming in the current HTTP protocol by enabling HTTP servers, such as DASH servers providing segments to DASH clients, to pass incomplete versions of segments in response to segment requests from the DASH clients. In an embodiment, a DASH client may generate a segment request including an incomplete version of a segment capable indication. Such a segment request may be a request message, such as a "GET" operation (i.e., method), including a header field indicating that the client is capable of using an incomplete version of a segment (e.g., an incomplete segment). In an embodiment, the header field may be an accept header field described in RFC 7231. For example, a GET operation with the accept header field indication "application/3gpp-partial" may indicate that the DASH client will accept partial segments in response to the segment request. In an embodiment, the header field may be a prefer header field described in RFC 7240. For example, a GET operation with the prefer header field indication "return=3gpp-partial" may indicate that the DASH client will accept partial segments in response to the segment request. In an embodiment, the segment request with the header field indicating that the client is capable of using an incomplete version of a segment may be sent in an initial request for a segment. In another embodiment, the segment request with the header field indicating that the client is capable of using an incomplete version of a segment may be sent in response to an initial error message, such as an error message including a status code 404 "Not Found", returned from a server. In response to receiving the initial error message, the client may re-request the previously requested segment, this time including the header field indicating that the client is capable of using an incomplete version of a segment. In a further embodiment, the segment request with the header field indicating that the client is capable of using an incomplete version of a segment may be sent in response to a byte range indication returned from a server, which includes an important portion of the segment that enables locating media samples (such as "trun" box in ISOBMFF). In response to receiving the initial byte range indication, the client may request subsequent byte range portions of the segment, this time including the header field indicating that the client is capable of using an incomplete version of a segment.

In an embodiment, a DASH server may generate and send an initial response message including an indication that an incomplete version of the requested segment is available and that the byte ranges of the segment that are available. In an embodiment, the response message may be a message including an extension header indicating that an incomplete version of the requested segment is available and the byte ranges available. For example, the initial response may be an error message including a status code 404 and an extension header "X-Available-Ranges: bytes a-b, c-d, . . . ". As another example, the initial response may be a partial content message including a status code 206 and extension header "X-Available-Ranges: bytes a-b, c-d, . . . ". In an embodiment, the response message may be a redirect message, such as a 300 series message, including an entity body indicating that an incomplete version of the requested segment is available and the byte ranges that are available, such as "Content-Type=3gpp-partial-byte-ranges".

In response to receiving the initial response message including an indication that an incomplete version of the requested segment is available and the byte ranges of the segment that are available from the DASH server, the DASH client may re-request the previously requested segment, this time including an indication of a partial byte range request corresponding to the portions indicated as available by the DASH server.

In an embodiment, a DASH server may generate and send a response message including an access position indication to a DASH client capable of using an incomplete version of a file. An access position indication may be an indication of a byte (or other data size) position in the requested file at which the DASH client may access the incomplete version of the file and begin parsing the incomplete version of the file to identify random access points (e.g., Stream Access Points (SAPs) type 1 or 2) or sync samples that may be used to decode and/or render the incomplete version of the file. Access position indications may be determined and indicated on a per file basis and/or on a per available byte range basis. For a DASH segment, for example, one or more access positions may be determined and associated with the DASH segment, such as in a File Delivery Table (FDT) describing the segments of a DASH media stream. For example, the access points may be indicated in the FDT in the field "IndependentUnitPositions" indicating one or more space-separated byte positions in the DASH segment at which the DASH client may access the segment.

For example, in response to receiving from a DASH client a request for an incomplete version of a DASH segment, the DASH server may send indications of the one or more access positions for the DASH segment with the incomplete version of the DASH segment. As another example, when an incomplete version of a file is available at the DASH server, the DASH server may determine one or more access positions for each byte range of the file that is available. In this manner, the DASH server may indicate one or more access positions for a first byte range (e.g., byte range a-b) of the incomplete version of a DASH segment and one or more access positions for a second byte range (e.g., byte range c-d) of the incomplete version of the DASH segment.

In the various embodiments, an access position may be indicated in an extension header in a response message sent by the DASH server. The response message may both indicate that the response includes an incomplete version of a requested DASH segment and indicate the access position for the incomplete version. For example, the response may include the extension header fields "3gpp-access-position" indicating one or more byte positions in the DASH segment at which the DASH client may access the segment, as well as including "application/3gpp-partial" as Content-Type indicating the response includes an incomplete version of the requested DASH segment.

In an embodiment, in response to receiving a response including an incomplete version of a segment and an access position indication, a DASH client may determine whether an initial portion of the segment is received. An initial portion of the segment may be a range of bytes at the beginning of a segment dedicated to indicating initialization, indexing, timing, and/or synchronization information for the segment. In response to determining that the initial portion of the segment is received, the DASH client may use the timing and/or synchronization information in the initial portion to parse the other received portions of the incomplete version of the segment. In response to determining that the initial portion of the segment is not received, the DASH client may determine whether the byte corresponding to the access position was received. In response to determining that the byte corresponding to the access position for the segment was received, the DASH client may start parsing the incomplete version of the segment at the access position to identify random access points (e.g., Stream Access Points (SAPs) type 1 or 2) or sync samples that may be used to decode and/or render the incomplete version of the segment. In response to determining that the byte corresponding to the access position for the segment was not received, the DASH client may request the next segment in the representation.

In an embodiment, a DASH server may generate and send an error message in response to a DASH client capable of using an incomplete version of a file requesting a file for which no bytes are available at the DASH server. For example, the DASH server may send an error message including a status code 416 "Requested Range Not Satisfiable" when no bytes for a requested DASH segment or byte range of a DASH segment are available at the DASH server. The error message may further indicate the content type provided in the FDT instance for the DASH segment, the content location provided in the FDT for the DASH segment, and the content range indicated as "bytes */content-length" based on the content length indicated in the FDT for the DASH segment. By receiving an error message including a status code 416 "Requested Range Not Satisfiable", the DASH client may distinguish between requests for invalid segments (e.g., requests resulting in error messages with a status code 404 "Not Found") and requests for segments that were lost in transmission (e.g., segments indicated in the FDT but without received bytes resulting in error messages with a status code 416 "Requested Range Not Satisfiable"). In an embodiment, the DASH client may conceal the lost in transmission segment indicated by the error message with the status code 416 and continue normal operation by requesting the next segment in the representation.

Various examples of different applications/clients, middleware, segment availability timelines, radio technologies, and transport protocols are discussed herein, specifically DASH clients, eMBMS, and HTTP. The discussions of DASH clients, eMBMS, and HTTP are provided merely as examples to better illustrate the aspects of the various embodiments, and are not intended to limit the various embodiments in any way. Other applications/clients, middleware, radio technologies, and transport protocols may be used with the various embodiments, and the other applications/clients, middleware, radio technologies, and transport protocols may be substituted in the various examples without departing from the spirit or scope of the invention.

FIG. 1 illustrates a cellular network system 100 suitable for use with the various embodiments. The cellular network system 100 may include multiple devices, such as a computing device 102, one or more cellular towers or base stations 104, and servers 108 and 112 connected to the Internet 110. The computing device 102 may exchange data via one or more cellular connections 106, including Code Division Multiple Access (CDMA), Time Division Multiple Access (TDMA), Global System for Mobile Communications (GSM), Personal Communication Service (PCS), Third Generation (3G), Fourth Generation (4G), Long Term Evolution (LTE), or any other type connection, with the cellular tower or base station 104. The cellular tower or base station 104 may be in communication with a router that may connect to the Internet 110. In this manner, via the connections to the cellular tower or base station 104, and/or Internet 110, data may be exchanged between the computing device 102 and the server(s) 108 and 112. In an embodiment, server 108 may be a content provider server or encoder (e.g., a content server) providing segments for output via a DASH client. In an embodiment, server 112 may be a Broadcast Multimedia Service Center (BMSC) server that may receive segments output from the encoder and control the Over-the-Air (OTA) transmission of the segments to the computing device 102. Of course, while features of receiver devices described herein may be described with reference to OTA transmissions, these features may be used in connection with wired transmissions, wireless transmissions, or a combination of wired and wireless transmissions. Thus, OTA transmission is not required.

Figure 2A:
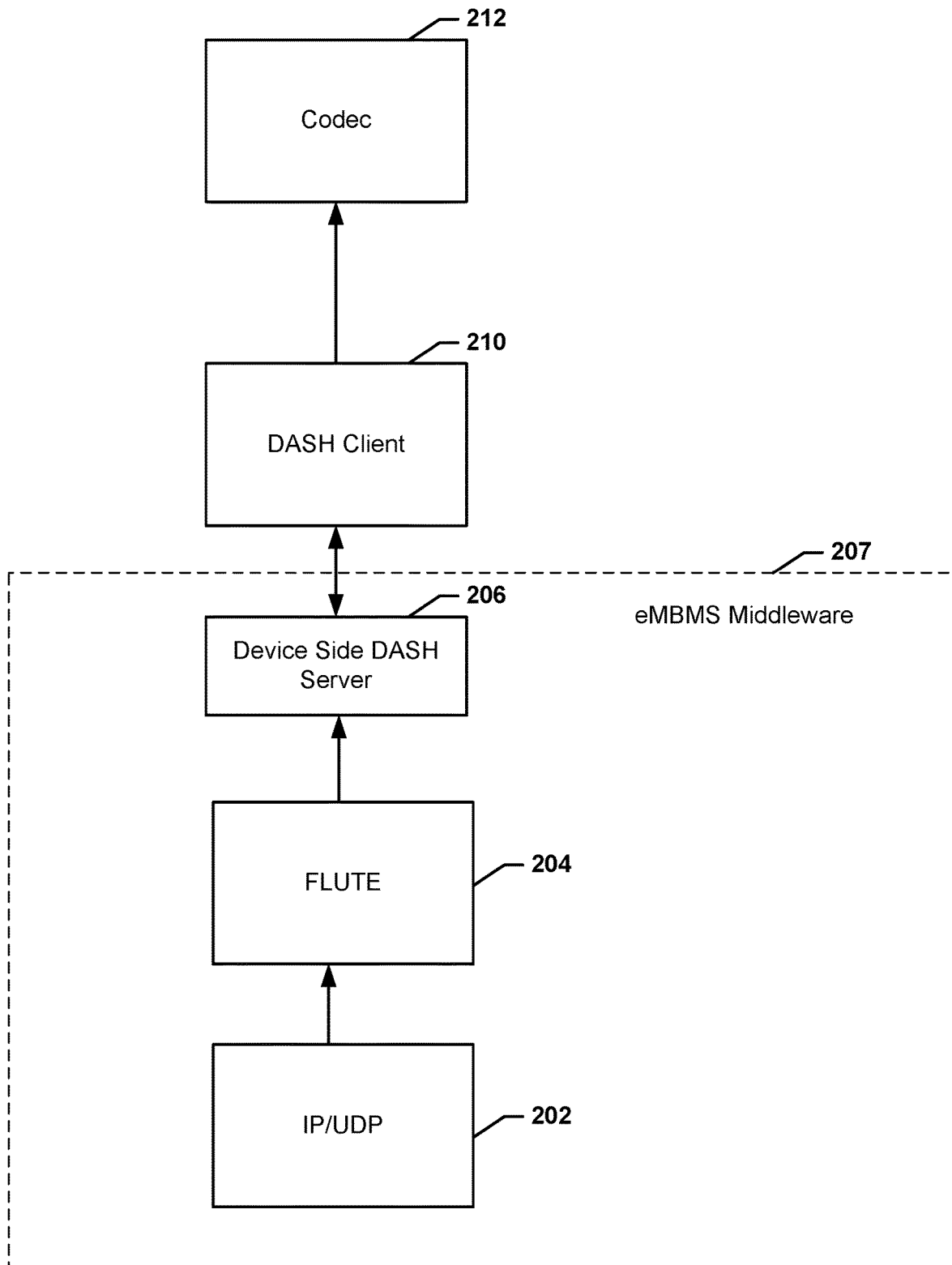
FIG. 2A is a system block diagram illustrating the relationship between transport layers and application and/or client layers in a computing device according to the various embodiments.

FIG. 2A illustrates an embodiment relationship between transport layers and application and/or client layers in a computing device. In an embodiment, files may be received at the computing device via the Internet Protocol/User Datagram Protocol (IP/UDP) transport layer 202. As an example, broadcast files sent from the server 112 to the computing device 102 via the Internet 110 as discussed above with reference to FIG. 1, may be received at the computing device 102 at the IP/UDP transport layer 202. In an embodiment, the files may be segments of a media file sent via the Internet.

The IP/UDP transport layer 202 may pass the received files to the File Delivery over Unidirectional Transport (FLUTE) layer 204. In an embodiment, the FLUTE layer 204 may be an application enabled to utilize the FLUTE protocol to pass files from the IP/UDP transport layer 202 to applications and/or clients, such as a DASH client 210. In an embodiment, the FLUTE layer 204 may apply error correction to the received files, such as forward error correction (FEC). In an embodiment, the FLUTE layer 204 may receive indications from the applications and/or clients, such as a DASH client 210, which may indicate whether the applications and/or clients are enabled to utilize incomplete versions of segments. As an example, a file request from the DASH client 210 may indicate that the DASH client 210 is enabled to utilize incomplete versions of files. The FLUTE layer 204 may parse the received files and pass the files to the device side HTTP server, such as a DASH server 206. The eMBMS middleware 207 running on the computing device may include one or more of the device side DASH server 206, FLUTE layer 204, and/or IP/UDP transport layer 202. In an embodiment, the device side DASH server 206 may be an HTTP server application resident on the computing device with its own assigned memory space (e.g., memory cache) on the computing device. In an embodiment, the DASH client 210 may request and/or receive files from the device side DASH server 206 and may pass the files to a codec 212 for eventual rendering of the content (e.g., playing the content) by the computing device. In an embodiment, a DASH client 210 may be enabled to utilize incomplete versions of files in rendering the content. In another embodiment, a DASH client 210 may be enabled to repair incomplete versions of files before rendering the content.

Figure 2B:
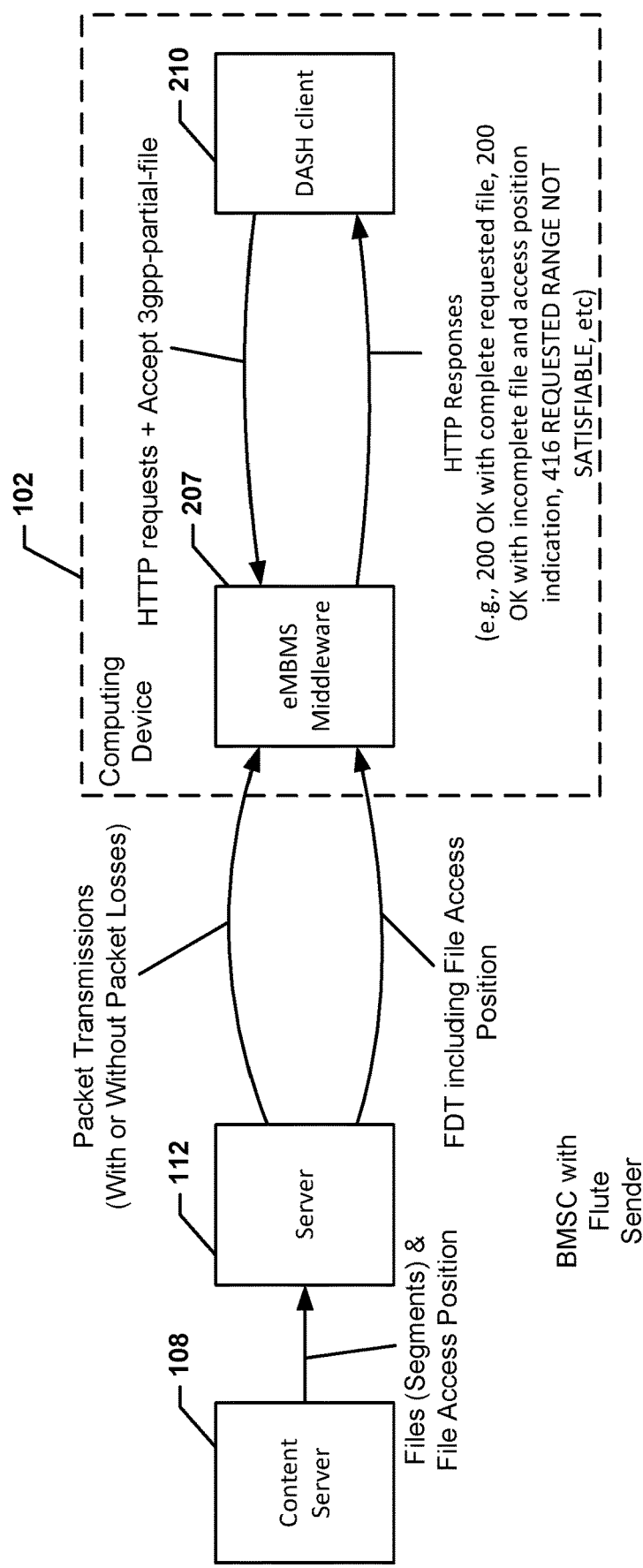
FIG. 2B is a system block diagram illustrating the relationship between network elements and computing device application and/or client layers according to the various embodiments.

FIG. 2B illustrates an embodiment relationship between network elements and computing device application and/or client layers. As an example, files (e.g., segments of a DASH media stream output by an encoder) may be sent from the content server 108 (e.g., a DASH server) to the server 112 (e.g., a BMSC server with a FLUTE sender). Additionally, the content server 108 may determine one or more access positions for the files (e.g., segments of the DASH media stream) and may send indications of the access positions to the server 112. Access positions may be indications of a byte position in the requested file at which a client may access an incomplete version of the file and begin parsing the incomplete version of the file to identify random access points (e.g., Stream Access Points (SAPs) type 1 or 2) or sync samples that may be used to decode and/or render the incomplete version of the file. While FIG. 2B illustrates the access positions being provided by the server 108, access positions may be determined and/or indicated by any element in the communication system, such as the server 112, the eMBMS middleware 207, etc. The server 112 may packetize the files for transmission to the computing device 102 and prepare a File Delivery Table (FDT) according to the FLUTE protocol. In an embodiment, the FDT may include indications of the access positions. For example, the FDT may include the attribute "IndependentUnitPositions" indicating one or more space-separated byte positions in the DASH segments at which the DASH client may access the segments.

The server 112 may transmit the FDT including the indications of the file access positions and the packets to the computing device 102. Packets may or may not be lost in transmission from the server 112 to the eMBMS middleware 207 of the computing device 102. A complete version of a file may be assembled by the eMBMS middleware 207 and made available to the DASH client 210 when packets for a file are not lost. An incomplete version of a file may be assembled by the eMBMS middleware 207 and made available to the DASH client 210 when less than all the packets for a file are lost, or when less than all the packets for a file are lost and not recoverable by applying error correction. No version of a file may be assembled by the eMBMS middleware 207 when all the packets for a file are lost and not recoverable by applying error correction. The eMBMS middleware 207 may identify whether a complete version, incomplete version, and/or no version of a file was received based on file indications in the received FDT.

The DASH client 210 may send a file request (e.g., a HTTP GET operation) indicating that the DASH client 210 is enabled to utilize incomplete versions of files (e.g., a GET operation with the Prefer header field indication "return=3gpp-partial", a GET operation with the Accept header field indication "application/3gpp-partial", etc.). The eMBMS middleware 207 (e.g., via the device side DASH server 206) may send a HTTP response to the DASH client 210 in response to the file request indicating that the DASH client 210 is enabled to utilize incomplete versions of files. As an example, the DASH server 206 may send a 200 OK response with the complete requested file when a complete version of the file is available. As another example, the DASH server 206 may send a 200 OK response with the incomplete version of the file and an indication of the access position associated with that file indicated in the received FDT when an incomplete version of the file is available. As a further example, the DASH server 206 may send a 416 "Requested Range Not Satisfiable" response with no payload when no portion of the file is available.

While FIGS. 2A and 2B illustrate and are discussed in terms of a DASH client 210 and a DASH server 206 running on one or more processors of a computing device, internal device server/client exchanges are merely on example of server/client exchanges, and the various embodiments described herein may be equally applicable to any type server/client exchange. For example, the DASH client 210 and DASH server 206 may be separate devices communicating over an external network, such as the Internet.

Figure 3:
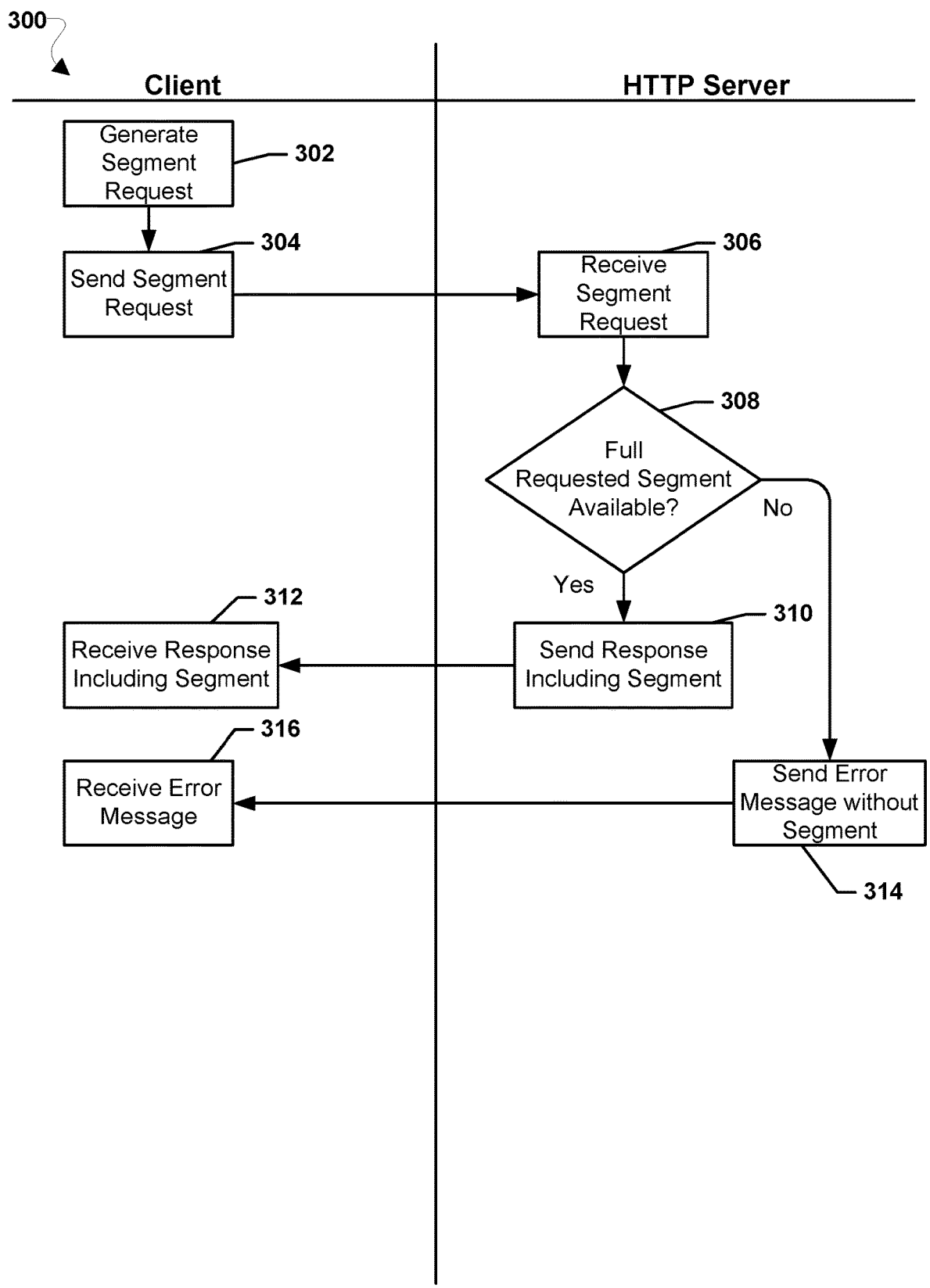
FIG. 3 is a process flow diagram illustrating a prior art method for HTTP server handling of client requests for incomplete versions of segments.

FIG. 3 illustrates the prior art method 300 employed by current HTTP servers for handling of client requests for incomplete versions of segments. In block 302, the client may generate a segment request. A segment request is a message, such as a "GET" operation (i.e., method) requesting a segment. The segment request includes the URL/URI of the requested segment. In the current HTTP protocol, segment requests may also be performed using the "partial GET" operation which may include a request for a portion of a segment at the URL/URI by including one or more byte ranges representing a subset of the total segment associated with the URL/URI. However, in the current HTTP protocol, the segment request does not include an indication that the client is enabled to utilize an incomplete version of a segment, with respect to either the full resource requested via the "GET," or a partial resource as indicated by the "partial GET." In effect, the current HTTP segment requests are effectively "all or nothing" requests indicating that the client can only use the entire segment or the entire subset of the segment being requested.

In block 306, the HTTP server receives the segment request sent by the client in block 304. In determination block 308, the HTTP server determines whether the full requested segment is available. The HTTP server may determine whether the full requested segment, or an entire subset is available by looking to the URL/URI associated with the segment request and determining whether the segment at the URL/URI is missing data and/or is corrupted in any way. In the current HTTP protocol, only if the segment or the sought entire subset is not missing data and/or not corrupted is the segment or the sought entire subset determined to be full segments and deemed eligible to be returned.

In response to determining that the full requested segment is available (i.e., determination block 308="Yes"), the HTTP server sends a response including the requested segment in block 310, and in block 312 the client receives the response including the segment. The response may include a status code indicating that the entire requested segment was retrieved successfully, such as 200 "OK."

In response to determining that the full requested segment in not available (i.e., determination block 308="No"), the HTTP server sends an error message without any portion of the requested segment in block 314, and the client receives the error message in block 316. The error message may include a status code, such as 404 "Not Found." The drawback to the current HTTP method 300 is that clients never receive the incomplete versions of segments available at the server. Thus, in current HTTP systems, clients that are enabled to use incomplete versions of segments cannot improve the end user media playback experience by playing incomplete versions of segments because they do not receive incomplete versions of segments from the HTTP servers.

The various embodiments improve the end user media playback experience by enabling DASH servers to provide incomplete versions of segments in response to client requests. FIGS. 4-15 illustrate embodiment methods for server handling of client requests for incomplete versions of segments. While discussed in terms of DASH client devices and DASH servers the operations of the embodiment methods illustrated in FIGS. 4-15 may be performed by any two devices and/or applications operating in a client/server relationship.

Figure 4:
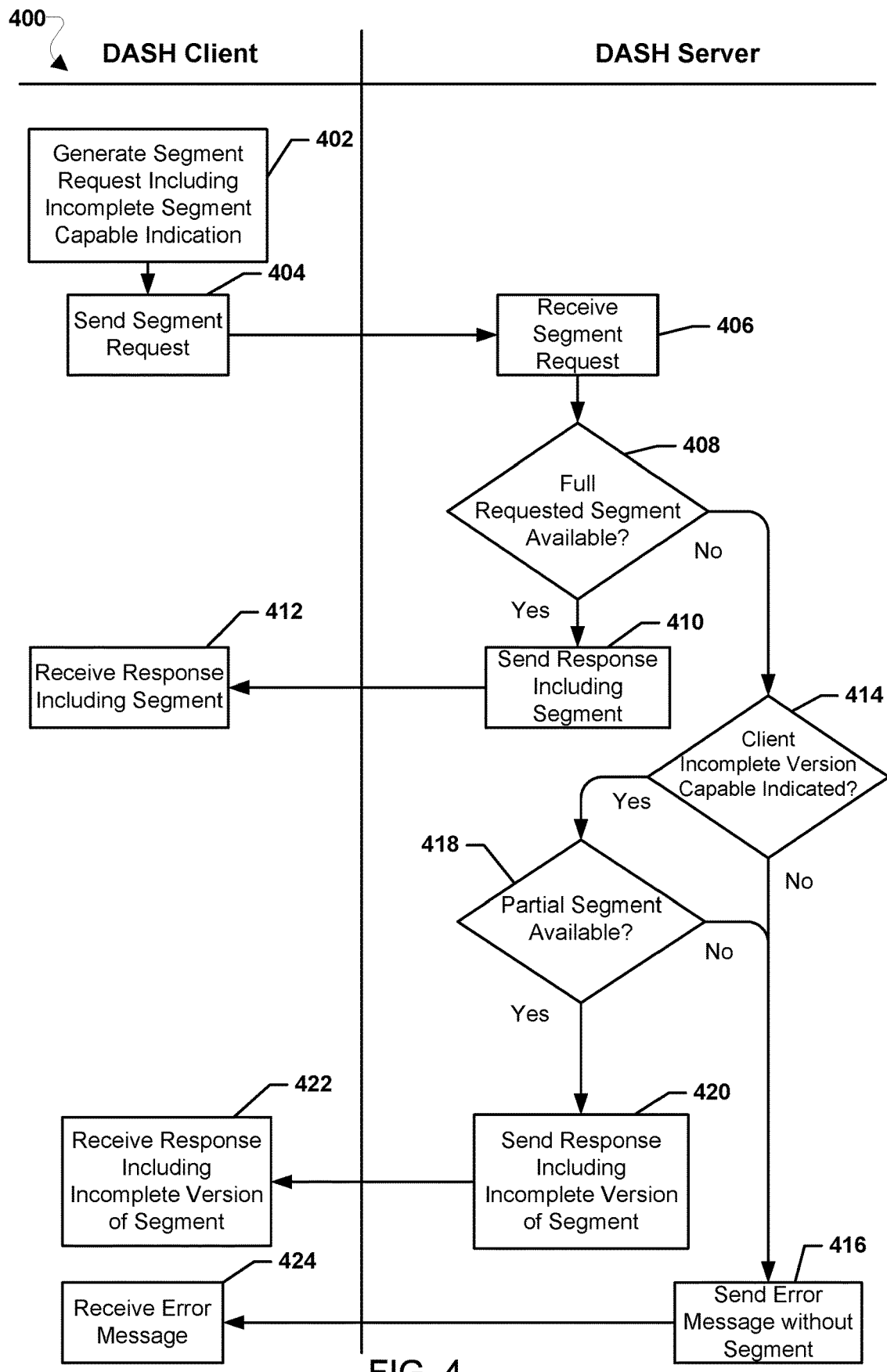
FIG. 4 is a process flow diagram illustrating an embodiment method for DASH server handling of DASH client requests for incomplete versions of segments.

FIG. 4 illustrates an embodiment method 400 for DASH server handling of DASH client requests for incomplete versions of segment. In an embodiment, the operations of method 400 may be performed by a DASH server in communication with a DASH client to deliver an incomplete response to a media file request from the DASH server to the DASH client. In block 402, the DASH client may generate a segment request including an incomplete version of a segment capable indication. In an embodiment, the segment request, including an incomplete version of a segment capable indication, may be a "GET" operation (i.e., method) including a header field indicating that the DASH client is capable of using an incomplete version of a segment (e.g., an incomplete segment). In an embodiment, the header field may be an accept header field described in RFC 7231. For example, a GET operation with the accept header field indication "application/3gpp-partial" may indicate that the DASH client will accept partial segments in response to the segment request. In an embodiment, the header field may be a prefer header field described in RFC 7240. For example, a GET operation with the prefer header field indication "return=3gpp-partial" may indicate that the DASH client will accept partial segments in response to the segment request.

In block 404 the DASH client may send the segment request to the DASH server, and in block 406 the DASH server may receive the segment request.

In determination block 408, the DASH server may determine whether the full requested segment is available. In an embodiment, the DASH server may determine whether the full requested file is available by looking to the URL/URI associated with the segment request and determining whether the segment at the URL/URI is missing data and/or is corrupted in any way. Those segments not missing data and/or not including corrupted data may be determined to be full segments. Those segments missing data and/or including corrupted data may be determined to be incomplete versions of segments.

In response to determining that that the full requested segment is available (i.e., determination block 408="Yes"), the DASH server may send a response including the full requested segment in block 410, and the DASH client may receive the response including the full requested segment in block 412. The response may include a status code indicating that the entire requested segment was retrieved successfully, such as 200 "OK."

In response to determining that the full requested segment is not available (i.e., determination block 408="No"), the DASH server may determine whether the DASH client has indicated it is capable of using an incomplete version of a segment in determination block 414. In an embodiment, the DASH server may determine the DASH client is capable of using an incomplete version of a segment based at least in part on the segment request header field indicating that the DASH client is capable of using an incomplete version of a segment.

In response to determining that the DASH client is not capable of using an incomplete version of a segment (i.e., determination block 414="No"), the DASH server may send an error message without any portion of the requested segment to the DASH client in block 416, and the DASH client may receive the error message in block 424. In an embodiment, the error message may be a message sent from the DASH server to the DASH client including an error status code, such as "404 Not Found."

In response to determining that the DASH client is capable of using an incomplete version of a segment (i.e., determination block 414="Yes"), the DASH server may determine whether the segment requested is partially available in determination block 418. As discussed above, in response to determining that the file requested is not partially available (i.e., determination block 418="No"), the DASH server may send an error message without the segment in block 416, and the DASH client may receive the error message in block 424.

In response to determining that the segment requested is partially available (i.e., determination block 418="Yes"), the DASH server may send a response from the DASH server to the DASH client including the incomplete version of a segment and an indication the segment is a partial segment in block 420. For example, the response may include "application/3gpp-partial" as Content-Type indicating that the segment is a partial segment. In block 422, the client device may receive the response including the incomplete version of a segment. The payload of the response identified by "application/3gpp-partial" as Content-Type may be included in the HTTP status code 200 "OK", which may be formatted as multipart/byteranges with boundary string identified in the Content-Type header. The following shows an example pseudo code of such a response that might be received by the DASH client assuming that the DASH server has the sets of byte ranges 0-1999 and 7000-7999 of the requested segment of size 8000 bytes at the time the DASH server receives the request:

```
HTTP/1.1 200 OK
Date: Wed, 25 Feb 2015 06:25:24 GMT
Content-Length: 3241
Content-Type: application/3gpp-partial;
boundary=THIS_STRING_SEPARATES
--THIS_STRING_SEPARATES
Content-Type: video/mp4
Content-Range: bytes 0-1999/8000
...the first range...
--THIS_STRING_SEPARATES
Content-Type: video/mp4
Content-Range: bytes 7000-7999/8000
...the second range
--THIS_STRING_SEPARATES—
```

Figure 5:
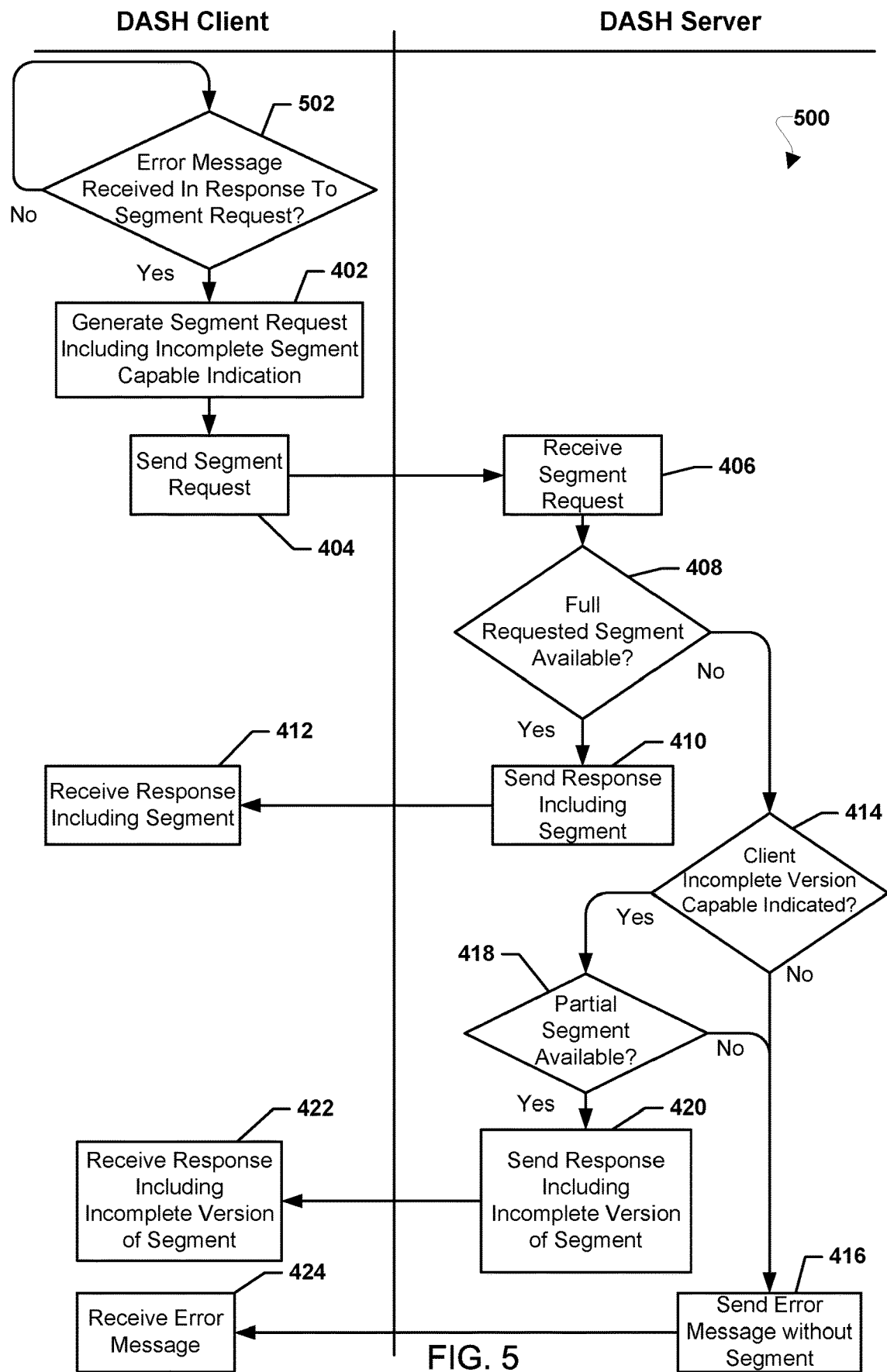
FIG. 5 is a process flow diagram illustrating another embodiment method for DASH server handling of DASH client requests for incomplete versions of segments.

FIG. 5 illustrates another embodiment method 500 for DASH server handling of DASH client requests for incomplete versions of segments. The operations of method 500 may be similar to the operations of the method 400 described above, except that the operations of method 500 may be performed after an initial segment request is sent by the DASH client with no special indication in it that the DASH client may be partial segment capable. In an embodiment, the operations of the method 500 may be performed by a DASH server in communication with a DASH client to deliver an incomplete response to a media file request from the DASH server to the DASH client.

In an embodiment, a DASH client may send initial segment requests without any special indication that the DASH client is capable of using an incomplete version of a segment. In response to receiving the full requested segment, no additional action may be taken by the DASH client. However, the DASH client may monitor for error messages received in response to segment requests, and in response to receiving the initial error message, the DASH client may re-request the previously requested segment, this time including the header field indicating that the client is capable of using an incomplete version of a segment. Thus, in determination block 502 the DASH client may determine whether an error message is received in response to a segment request. In response to determining that no error message is received (i.e., determination block 502="No"), the DASH client may continue to monitor for error messages in determination block 502.

In response to determining that an error message is received (i.e., determination block 502="Yes"), the DASH client and DASH server may perform operations in blocks 402-424 of like numbered blocks of method 400 described above with reference to FIG. 4 to attempt to receive a partial segment in response to the error message.

Figure 6:
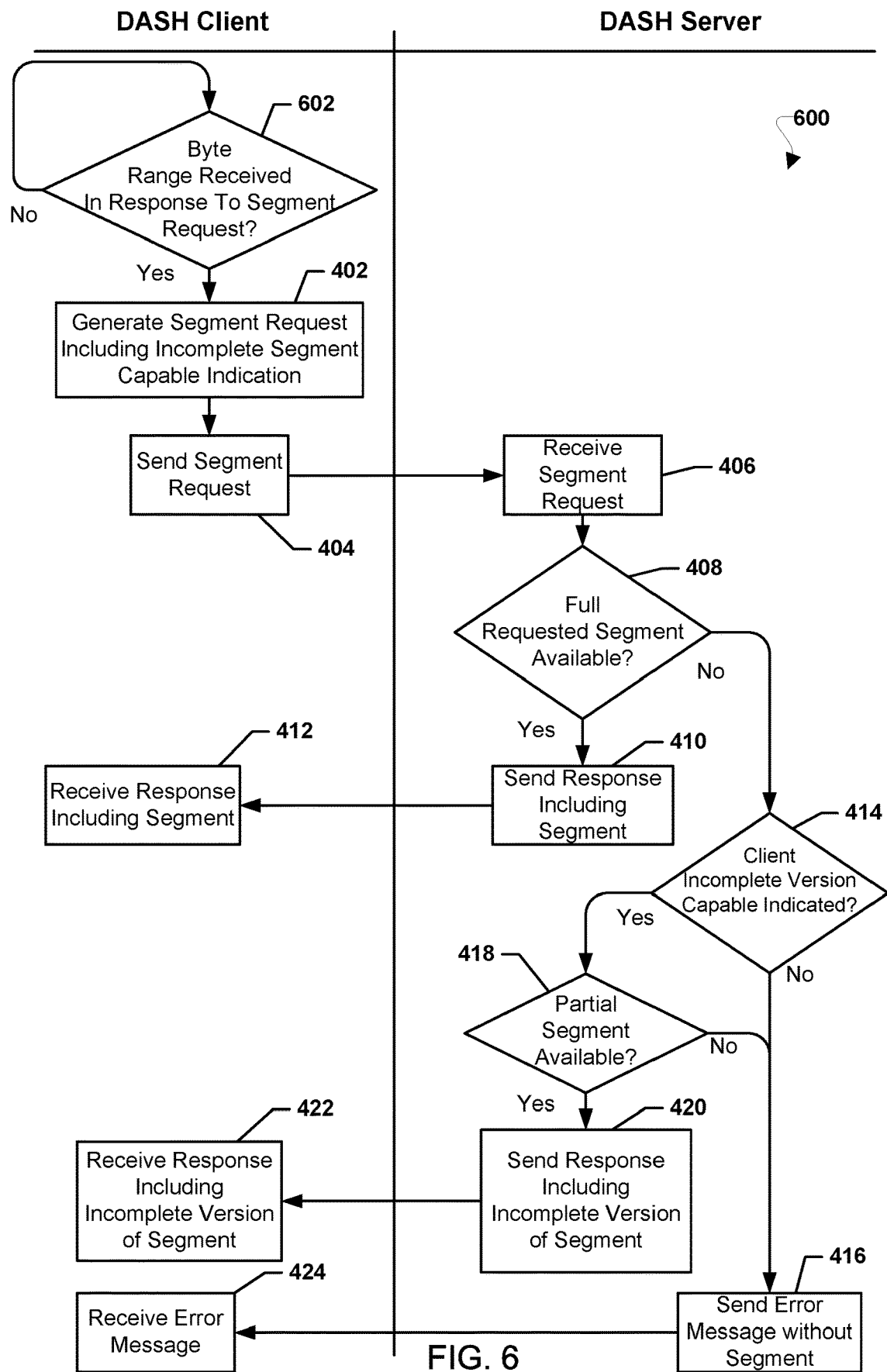
FIG. 6 is a process flow diagram illustrating a third embodiment method for DASH server handling of DASH client requests for incomplete versions of segments.

FIG. 6 illustrates another embodiment method 600 for DASH server handling of DASH client requests for incomplete versions of segments. The operations of the method 600 may be similar to the operations of the method 400 described above, except that the operations of the method 600 may be performed after an initial segment request is sent by the DASH client with no special indication in it that the DASH client is capable of using partial segments. In an embodiment, the operations of the method 600 may be performed by a DASH server in communication with a DASH client to deliver an incomplete response to a media file request from the DASH server to the DASH client.

In an embodiment, a DASH client may send initial segment requests without any special indication that the DASH client is capable of using an incomplete version of a segment. In response to receiving the full requested segment, no additional action may be taken by the DASH client. However, the DASH client may monitor for byte range indications and in response to receiving the byte range indication from the DASH server, the DASH client may request subsequent portions of the segment using other byte ranges, this time including the header field indicating that the client is capable of using an incomplete version of a segment. Thus, in determination block 602 the DASH client may determine whether byte range is received in response to a segment request. For example, the DASH client may determine whether a partial content message including a status code 206 and a byte range indication of the portions of the segment available at the server are received. In response to determining that no byte range is received (i.e., determination block 602="No"), the DASH client may continue to monitor for a byte range in determination block 602. In response to determining that a byte range is received (i.e., determination block 602="Yes"), the DASH client and DASH server may perform operations in blocks 402-424 of like numbered blocks of the method 400 described above with reference to FIG. 4 to attempt to receive a partial segment in response to the received byte range.

Figure 7:
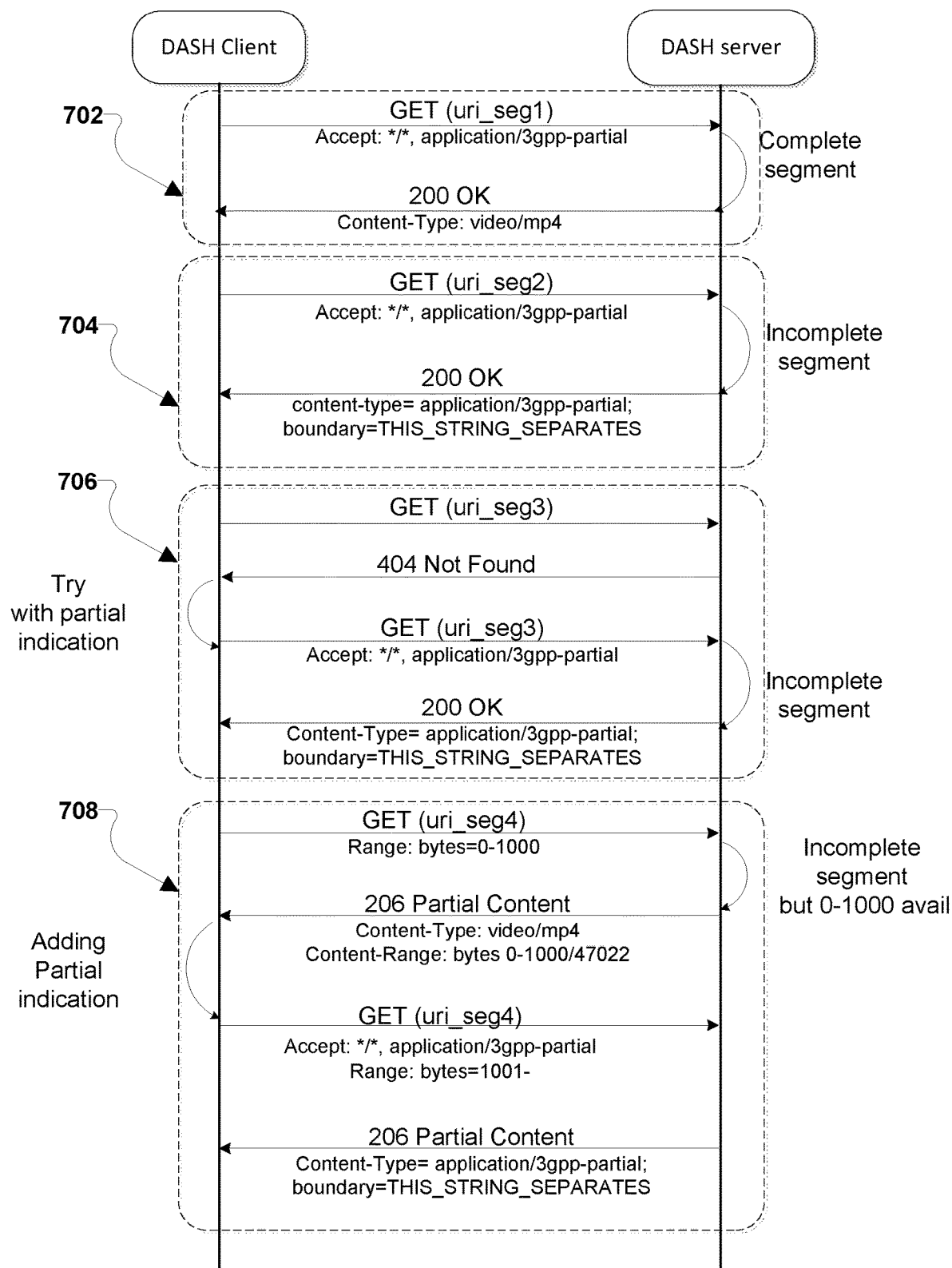
FIGS. 7 and 8 are call flow diagrams illustrating interactions between a DASH client and DASH server according to various embodiments.

FIG. 7 is a call flow diagram illustrating interactions between a DASH client and a DASH server according to various embodiments in which the DASH client may generate a segment request including, as an Accept header field described in RFC 7231, an indication that the client is capable of using an incomplete version of a segment. For example, a GET operation with the Accept header field indication "application/3gpp-partial" may indicate that the DASH client will accept partial segments in response to the segment request.

For example, in call series 702, the DASH client may send a GET with the Accept header field indication "application/3gpp-partial" and because the full segment is available at the DASH server, a 200 response with the full segment may be returned. In call series 704 the DASH client may send a GET with the Accept header field indication "application/3gpp-partial" and only a portion of the segment may be available at the DASH server. Because the Accept header indicates that the DASH client is capable of using a partial segment, the DASH server may determine the DASH client is partial segment capable, and a 200 response with the partial segment may be returned.

In call series 706 the DASH client may initially send a GET with no special segment capability indication, and the DASH server may return a 404 error message because only a partial segment is available. In response, the DASH client may send a GET with the Accept header field indication "application/3gpp-partial" to re-request the segment. Because the Accept header indicates that the DASH client is partial segment capable, the DASH server may determine the DASH client is capable of using a partial segment, and a 200 response with the partial segment may be returned.

In call series 708 the DASH client may initially send a partial GET with a byte range indication and no special segment capability indication, and the DASH server may return a 206 partial content message because the requested by range that is available. In response, the DASH client may send a GET with the Accept header field indication "application/3gpp-partial" to request a subsequent portion of the segment, such as byte ranges beyond byte 1000. The DASH server may determine that the DASH client is capable of using a partial segment based on the indication in the Accept header, and return a 206 partial content response with any content beyond byte 1000.

Figure 8:
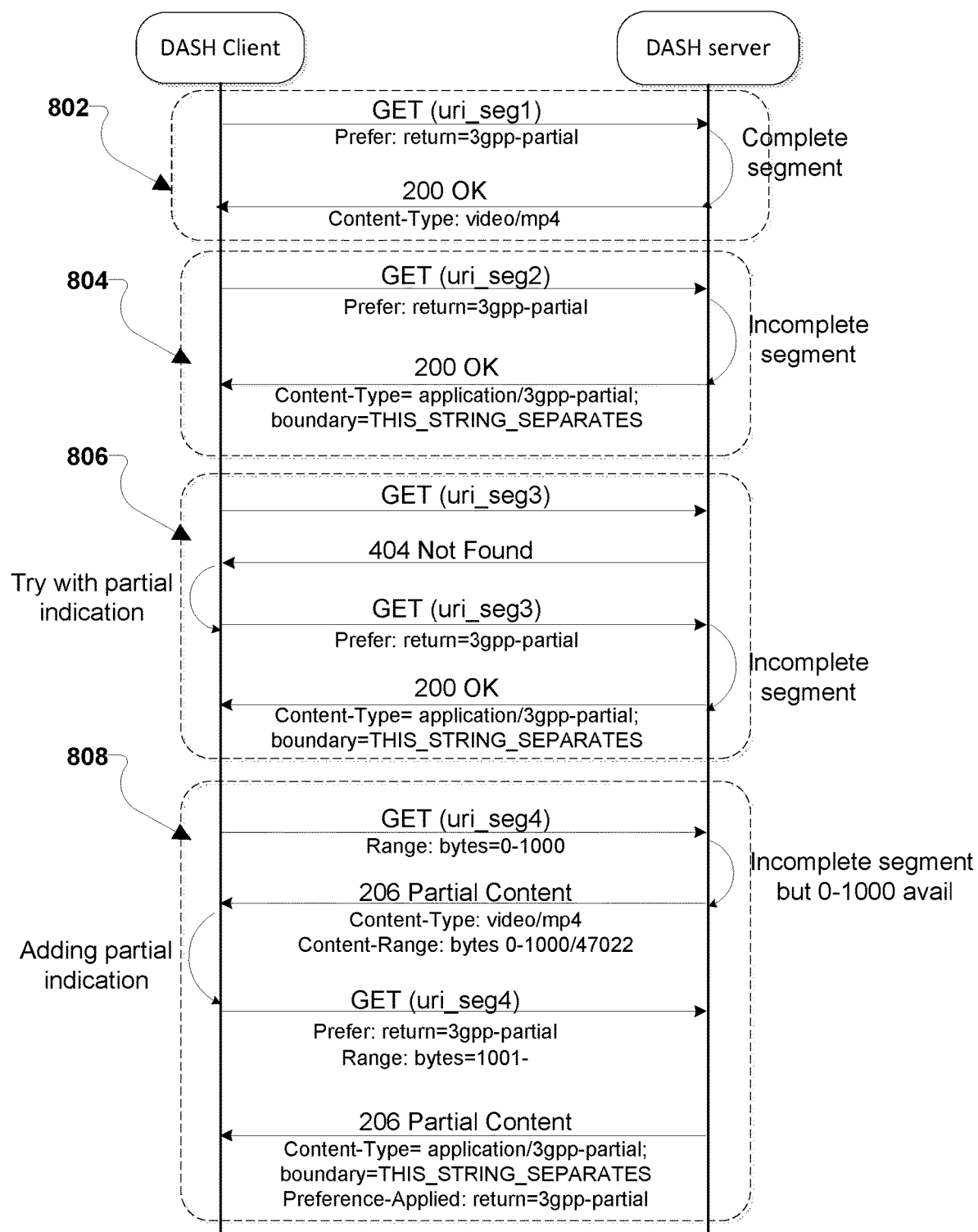

FIG. 8 illustrates interactions between a DASH client and DASH server according to various embodiments according to various embodiments in which the DASH client may generate a segment request including an incomplete version of a segment capable indication as a Prefer header field described in RFC 7240. For example, a GET operation with the Prefer header field indication "return=3gpp-partial" may indicate that the DASH client will accept partial segments in response to the segment request.

For example, in call series 802, the DASH client may send a GET with the Prefer header field indication "return=3gpp-partial" and because the full segment is available at the DASH server, a 200 response with the full segment may be returned.

In call series 804, the DASH client may send a GET with the Prefer header field indication "return=3gpp-partial" but only a portion of the segment may be available at the DASH server. Because the Prefer header indicates that the DASH client is capable of using a partial segment, the DASH server may determine the DASH client is capable of using a partial segment and return a 200 response with the partial segment.

In call series 806, the DASH client may initially send a GET with no special segment capability indication, and the DASH server may return a 404 error message because only a partial segment may be available. In response, the DASH client may send a GET with the Prefer header field indication "return=3gpp-partial" to re-request the segment. The DASH server may determine the DASH client is capable of using a partial segment based on the Prefer header indication, and return a 200 response with the partial segment.

In call series 808, the DASH client may initially send a partial GET with a byte range indication and no special segment capability indication, and the DASH server may return a 206 partial content message because the requested byte range that is available. In response, the DASH client may send a GET with the Prefer header field indication "return=3gpp-partial" to request a subsequent portion of the segment, such as byte ranges beyond byte 1000. Because the Prefer header indicates that the DASH client is capable of using a partial segment, the DASH server may determine the DASH client is capable of using a partial segment and return a 206 partial content response with any content beyond byte 1000.

Figure 9:
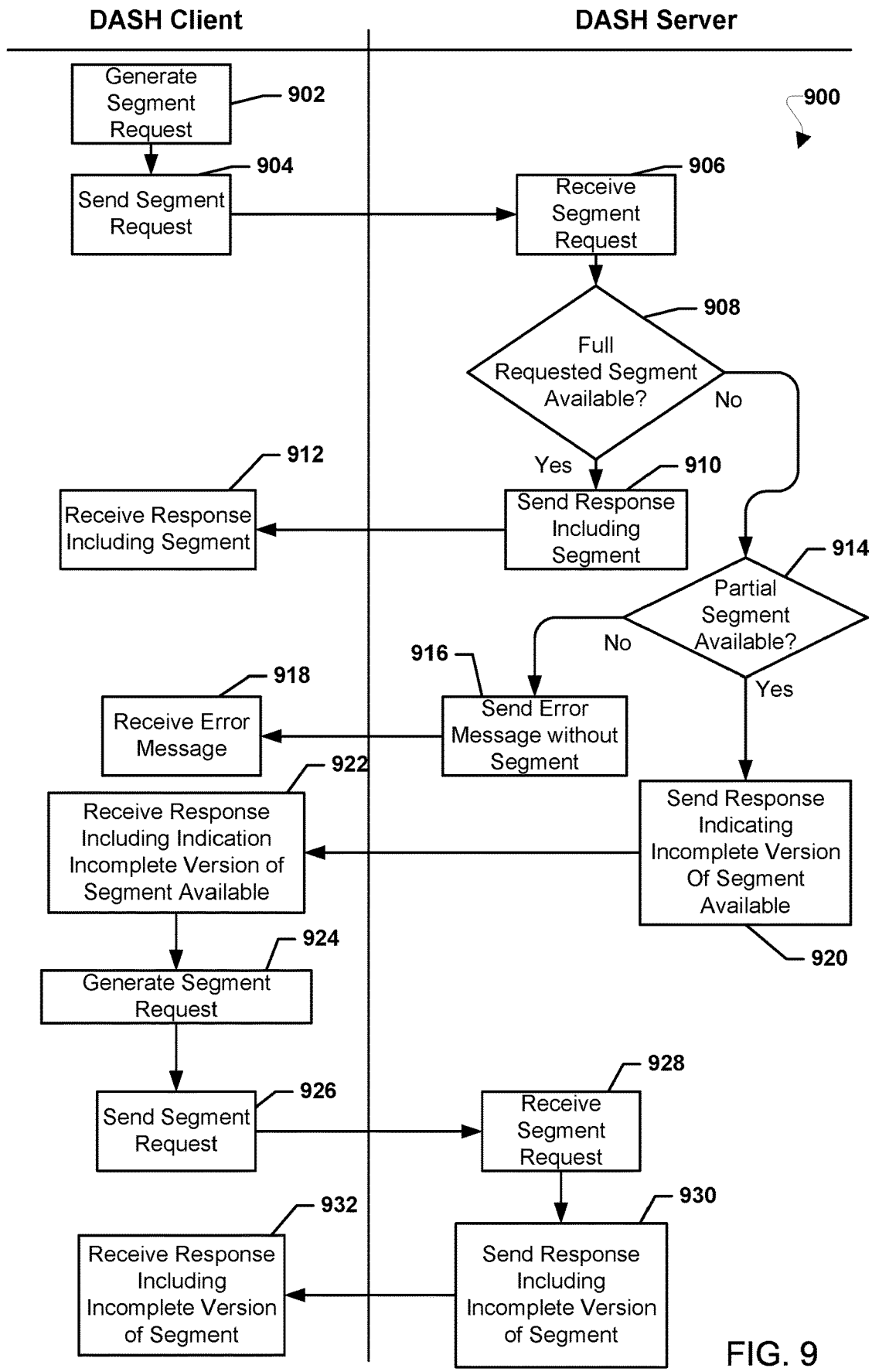
FIG. 9 is a process flow diagram illustrating a fourth embodiment method for DASH server handling of DASH client requests for incomplete versions of segments.

FIG. 9 illustrates an embodiment method 900 for DASH server handling of DASH client requests for incomplete versions of segments. In an embodiment, the operations of the method 900 may be performed by a DASH server in communication with a DASH client to deliver an incomplete response to a media file request from the DASH server to the DASH client. In block 902, the DASH client may generate a segment request. The segment request may not include any special indication of DASH client capability. In block 904 the DASH client may send the segment request to the DASH server, and in block 906 the DASH server may receive the segment request.

In determination block 908, the DASH server may determine whether the full requested segment is available. In an embodiment, the DASH server may determine whether the full requested file is available by looking to the URL/URI associated with the segment request and determining whether the segment at the URL/URI is missing data and/or is corrupted in any way. Those segments not missing data and/or not including corrupted data may be determined to be full segments. Those segments missing data and/or including corrupted data may be determined to be incomplete versions of segments.

In response to determining that that the full requested segment is available (i.e., determination block 908="Yes"), the DASH server may send a response including the full requested segment in block 910, and the DASH client may receive the response including the full requested segment in block 912. The response may include a status code indicating that the entire requested segment was retrieved successfully, such as 200 "OK."

In response to determining that the full requested segment is not available (i.e., determination block 908="No"), the DASH server may determine whether the segment requested is partially available in determination block 914. In response to determining that the segment requested is not partially available (i.e., determination block 914="No"), the DASH server may send an error message without any portion of the requested segment to the DASH client in block 916, and the DASH client may receive the error message in block 918. In an embodiment, the error message may be a message sent from the DASH server to the DASH client including an error status code, such as "404 Not Found."

In response to determining that the segment is partially available (i.e., determination block 914="Yes"), the DASH server may send a response from the DASH server to the DASH client including an indication that an incomplete version of the segment is available at the DASH server in block 920, and the DASH client may receive the response in block 922. In an embodiment, the response message may include an indication that an incomplete version of the requested segment is available and the byte ranges of the segment that are available. In an embodiment, the response message may be a message including an extension header indicating that an incomplete version of the requested segment is available and the byte ranges available. For example, the initial response may be an error message including a status code 404 and an extension header "X-Available-Ranges: bytes a-b, c-d, ... ". As another example, the initial response may be a partial content message including a status code 206 and extension header "X-Available-Ranges: bytes a-b, c-d, ... ". In an embodiment, the response message may be a redirect message, such as a 300 series message, including an entity body indicating that an incomplete version of the requested segment is available and the byte ranges that are available, such as "Content-Type=3gpp-partial-byte-ranges".

In block 924, the DASH client may generate a segment request. The segment request may be generated to receive an incomplete version of a segment. The segment request may include an indication that the client is capable of using an incomplete version of a segment. For example, a GET operation with the accept header field indication "application/3gpp-partial" may indicate that the DASH client will accept partial segments in response to the segment request. In an embodiment, the segment request for an incomplete version of a segment may be a "Partial GET" operation (i.e., method), including an indication of the byte ranges the DASH server indicated were available for the segment. In block 926, the DASH client may send the segment request to the DASH server, and in block 928 the DASH server may receive the segment request.

In response to receiving the segment request with the indicated byte ranges, the DASH server may send a response to the DASH client including the incomplete version of a segment in block 930. In an embodiment, the response including the incomplete version of the segment may include an indication that the segment is a partial segment. For example, the response may include "multipart/byteranges" as Content-Type with associated boundary indication, such as "boundary=THIS_STRING_SEPARATES" indicating that the segment is a partial segment. In block 932, the client may receive the response including the incomplete version of a segment.

Figure 10:
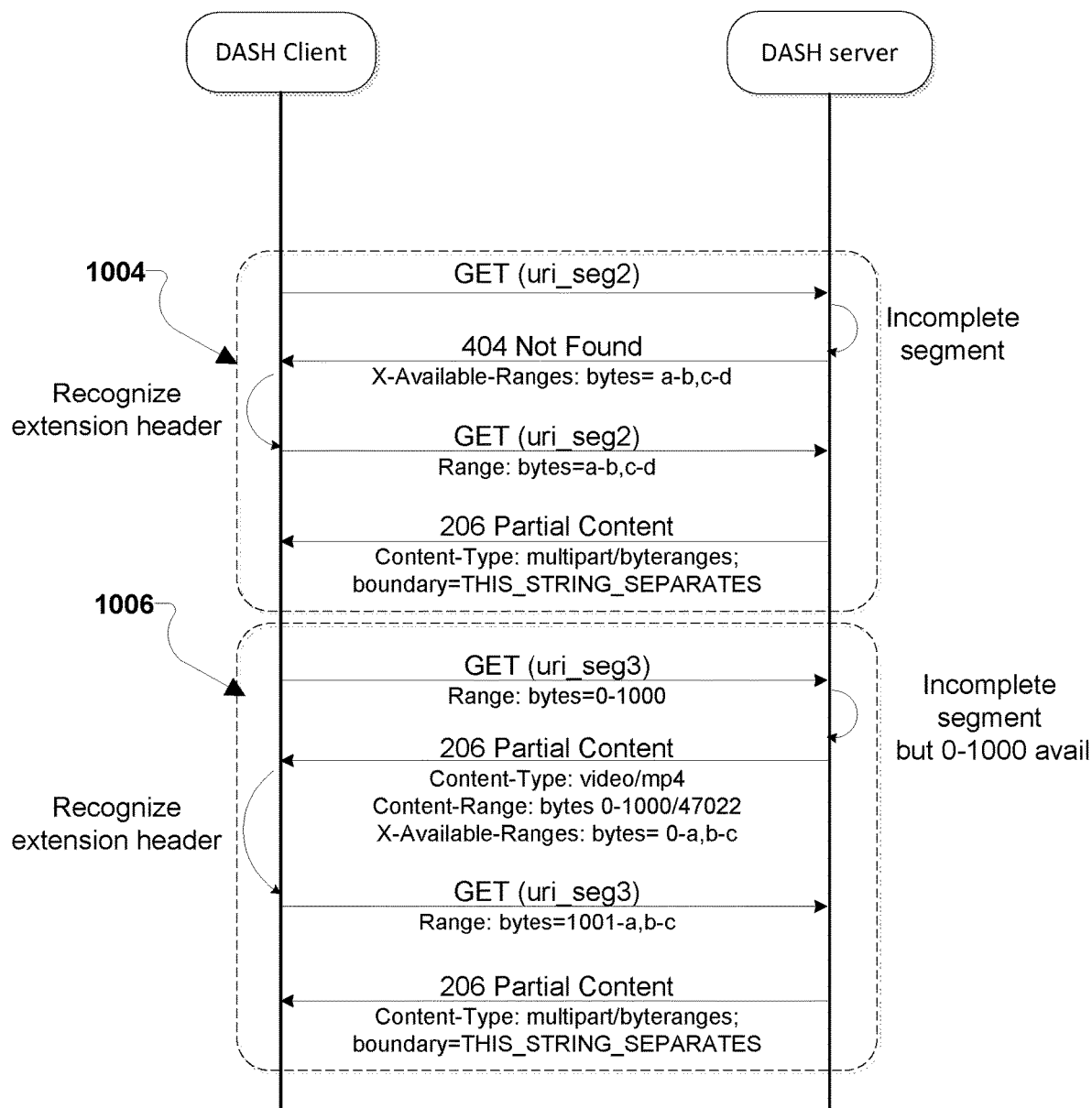
FIGS. 10 and 11 are call flow diagrams illustrating interactions between a DASH client and DASH server according to various embodiments.

FIG. 10 illustrates interactions between a DASH client and DASH server according to various embodiments in which the response message initially sent from the DASH server is a message including an extension header indicating that an incomplete version of the requested segment is available and the byte ranges that are available.

For example, in call series 1004 the initial response to a GET from the DASH client may be an error message from the DASH server including a status code 406 and an extension header "X-Available-Ranges: bytes a-b, c-d, ... ". A partial segment capable DASH client may interpret the extension header as indicating that a partial segment is available, and may send a Partial GET request including an indication of the byte ranges that the DASH server indicated were available for the segment. Based on the indicated byte ranges in the GET request, the DASH server may return a 206 partial content response with the requested available segment ranges.

As another example, in call series 1006 the initial response to a GET from the DASH client may be a partial content message including a status code 206 and extension header "X-Available-Ranges: bytes a-b, c-d". A partial-segment-capable DASH client may interpret the extension header as indicating that a partial segment is available and may send a Partial GET request including an indication of the byte ranges that the DASH server indicated were available for the segment. Based on the byte ranges included in the GET request the DASH server may return a 206 partial content response with the requested available segment ranges.

Figure 11:
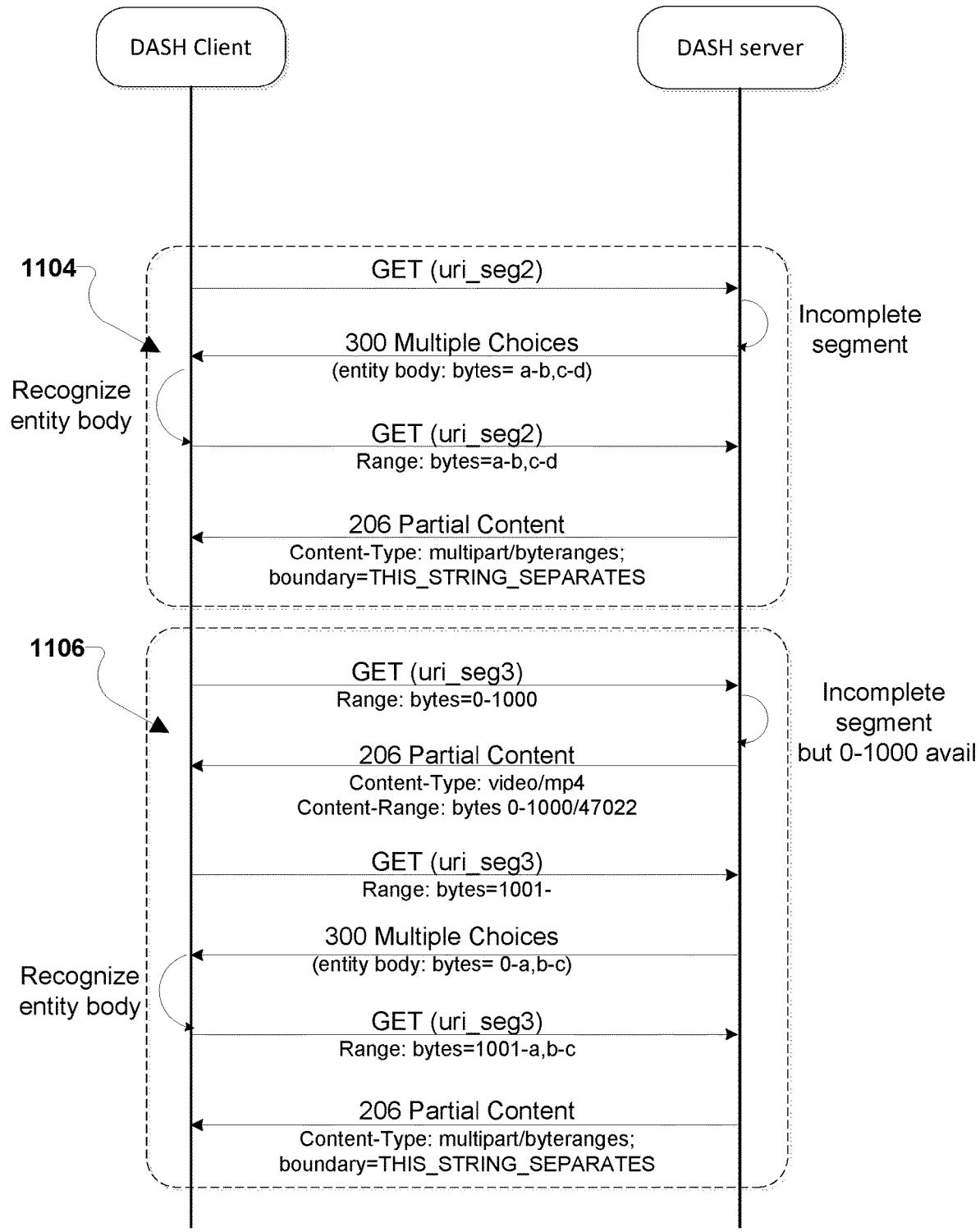

FIG. 11 illustrates interactions between a DASH client and DASH server according to various embodiments in which the initial response message from the DASH server is a redirect message, such as a 300 series message, including an entity body indicating that an incomplete version of the requested segment is available and the byte ranges that are available, such as "Content-Type=3gpp-partial-byte-ranges".

For example, in call series 1104 the initial response to a GET from the DASH client may be a redirect message, such as a 300 series message, including an entity body indicating that an incomplete version of the requested segment is available and the byte ranges that are available, such as "Content-Type=3gpp-partial-byte-ranges." In this manner, the DASH server may not redirect the DASH client, but rather direct the client back to the same segment merely with an indication that the segment is only partially available. A partial segment capable DASH client may interpret the 300 message with the entity body as indicating that a partial segment may be available and may send a Partial GET request including an indication of the byte ranges that the DASH server indicated were available for the segment. Based on the byte ranges included in the GET request, the DASH server may return a 206 partial content response with the requested available segment ranges.

As another example, in call series 1106 the DASH client may initially send a partial GET with a byte range indication and no special segment capability indication, and the DASH server may return a 206 partial content message with the requested byte range that is available. The DASH client may then send a partial GET request to request a subsequent portion of the segment, such as byte ranges beyond byte 1000. Because a partial segment beyond byte 1000 is available, the response from the DASH server may be a redirect message, such as a 300 series message, including an entity body indicating that an incomplete version of the requested segment is available and the byte ranges that are available, such as "Content-Type=3gpp-partial-byte-ranges". In this manner, the DASH server may not redirect the DASH client, but rather direct the client back to the same segment merely with an indication the segment is only partially available. A partial segment capable DASH client may interpret the 300 message with the entity body as indicating that a partial segment is available and may send a GET request including an indication of the byte ranges that the DASH server indicated were available beyond byte 1000 for the segment. Based on the byte ranges included in the GET request the DASH server may return a 206 partial content response with the requested available segment ranges beyond byte 1000.

Figure 12:
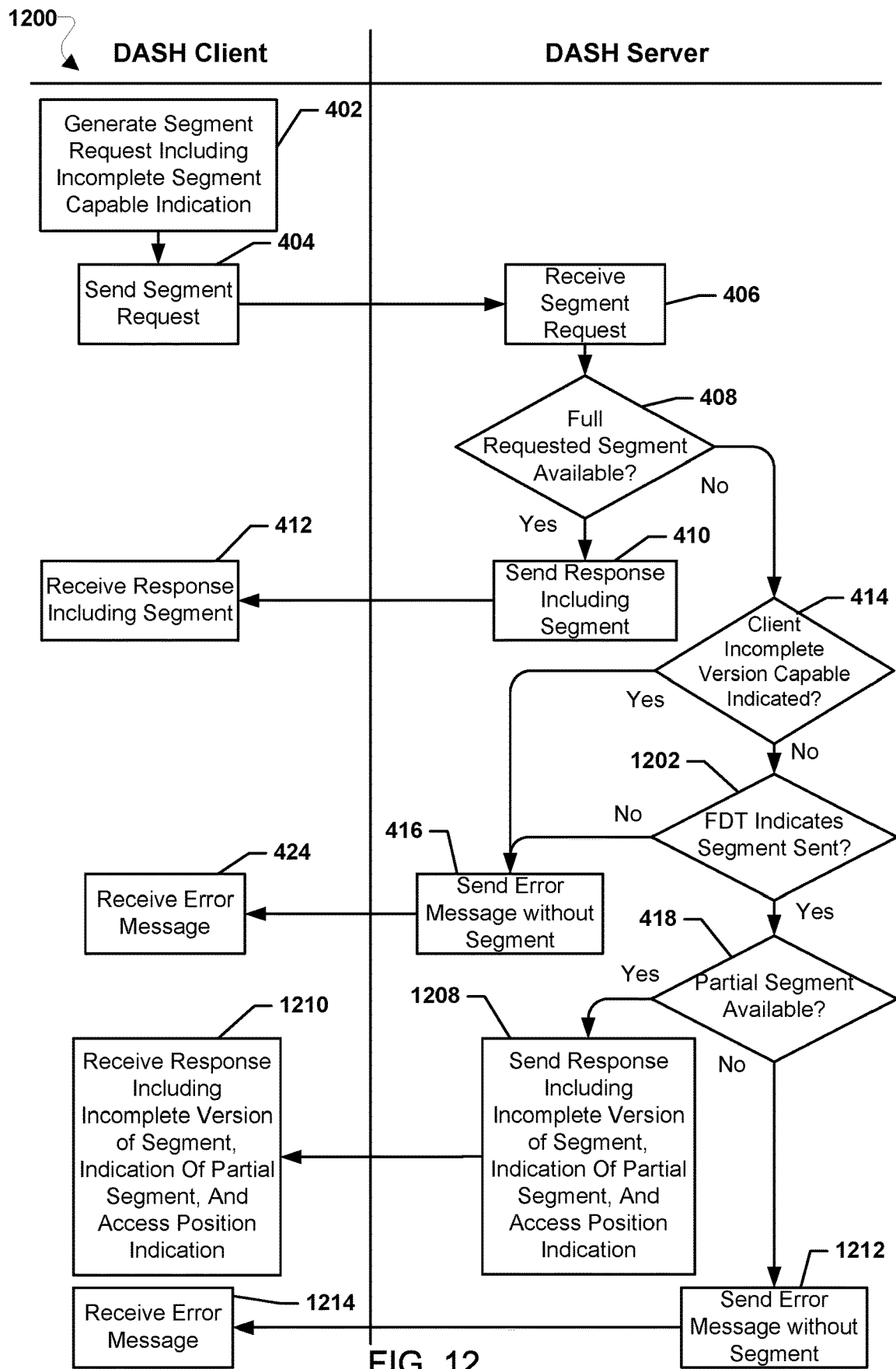
FIG. 12 is a process flow diagram illustrating a fifth embodiment method for DASH server handling of DASH client requests for incomplete versions of segments.

FIG. 12 illustrates another embodiment method 1200 for DASH server handling of DASH client requests for incomplete versions of segments. The operations of the method 1200 may be similar to the operations of the method 400 described above, except that the operations of method 1200 may be performed when access positions are associated with the segments. In an embodiment, the operations of the method 1200 may be performed by a DASH server in communication with a DASH client to deliver an incomplete response to a media file request from the DASH server to the DASH client. In blocks 402-424 the DASH client and DASH server may perform operations of like numbered blocks of the method 400 described above with reference to FIG. 4 to provide responses including the full requested segment or error messages when the client is not capable of using incomplete versions of segments.

In response to determining that the DASH client is capable of using an incomplete version of a segment (i.e., determination block 414="Yes"), the DASH server may determine whether the FDT received indicated the segment requested by the DASH client was sent to the DASH server in determination block 1202. By checking the FDT for the DASH representation including the requested segment, the DASH server may determine whether the requested segment is an actual segment associated with the representation. In this manner, the DASH server may distinguish erroneous requests for segments of a media stream from valid requests for segments of a media stream.

In response to determining that the FDT does not list the requested segment (i.e., determination block 1202="No"), in blocks 416 and 424 the DASH server and DASH client may perform operations of like numbered blocks of the method 400 described above with reference to FIG. 4 in order to indicate an error.

In response to determining that the FDT does list the requested segment (i.e., determination block 1202="Yes"), the DASH server may determine whether the segment requested is partially available in determination block 418. In response to determining that the file requested is not partially available (i.e., determination block 418="No"), the DASH server may send an error message without the segment in block 1212. In this manner, the DASH server may generate and send an error message in response to a DASH client capable of using an incomplete version of a segment requesting a segment for which no bytes are available at the DASH server. For example, the DASH server may send an error message including a status code 416 "Requested Range Not Satisfiable", when no bytes for a requested DASH segment or byte range of a DASH segment are available at the DASH server. The error message may further indicate the content type provided in the FDT instance for the DASH segment, the content location provided in the FDT for the DASH segment, and the content range indicated as "bytes */content-length" based on the content length indicated in the FDT for the DASH segment.

In block 1214 the DASH client may receive the error message. By receiving an error message including a status code 416 "Requested Range Not Satisfiable", the DASH client may distinguish between requests for invalid segments (e.g., requests resulting in error messages with a status code 404 "Not Found") and requests for segments that were lost in transmission (e.g., segments indicated in the FDT but without received bytes resulting in error messages with a status code 416 "Requested Range Not Satisfiable"). In an embodiment, the DASH client may conceal the lost in transmission segment indicated by the error message with the status code 416 and continue normal operation by requesting the next segment in the representation.

In response to determining that the segment requested is partially available (i.e., determination block 418="Yes"), the DASH server may send a response from the DASH server to the DASH client including the incomplete version of a segment, an indication the segment is a partial segment, and an indication of one or more access positions for the segment in block 1208. For example, the response may include "application/3gpp-partial" as Content-Type indicating that the segment is a partial segment and the extension header fields "3gpp-access-position" indicating one or more byte positions in the DASH segment at which the DASH client may access the segment. The response may further include an indication of the portion of the segment included in the response. For example, the response may include one or more header fields (e.g., a content-range header field) that indicate one or more bytes ranges of the segment included in the response. In such embodiments, where the response includes one or more header fields that indicate one or more bytes ranges of the segment included in the response, one or more extension header fields "3gpp-access-position" may include one or more byte positions, which are in the one or more indicated byte ranges and at which the DASH client may access the segment. In various embodiments, the one or more access positions for the segment may be indicated to the DASH server as a "mbms2015:IndependentUnitPositions" attribute of the file entry of an FDT instance of the incompletely received version of the DASH segment. When file entries of all FDT instances of the incompletely received version of the DASH segment do not include a "mbms2015:IndependentUnitPositions" attribute, the DASH server may analyze the incompletely received version of the DASH segment to determine one or more movie fragment headers (moofs) locations to identify the one or more moofs as one or more access positions for the segment.

In block 1210, the DASH client may receive the response including the incomplete version of a segment, the indication that the response includes a partial segment, and the indication of the one or more access points. The received response may also include an indication of the portion of the segment included in the response, for instance, in a content-range header field. The payload of the response identified by "application/3gpp-partial" as Content-Type may be included in the HTTP status code 200 "OK", which may be formatted as multipart/byteranges with boundary string identified in the Content-Type header and one or more comma-separated byte positions corresponding to the access point(s) for the segment indicated in the field "3gpp-access-position".

In an example, the DASH server may have the sets of byte ranges 0-19999, 50000-85000, 105500-199888, and 201515-229566 of the requested segment of size 256000 bytes at the time the DASH server receives the request, and the file entry for an FDT instance for the DASH segment may include the attribute "mbms2015:IndependentUnitPositions" with the following list of values "0 60000 80000 110000". In such an example, the DASH server may identify the byte ranges of the first access position as: 0-59999, the second access position as: 60000-79999, the third access position as: 80000-109999, and the fourth access position as: 110000-255999. Because the first byte rage available to the DASH server (0-19999) contains the beginning of the first access position, the DASH server may include "3gpp-access-position: 0" in the response. The second byte range available to the DASH server (50000-85000) may contain the second access position and part of the third access position, and therefore the DASH server may include "3gpp-access-positions: 60000, 80000" in the response. Similarly, the third byte range available to the DASH server (105500-199888) may contain part of the fourth access position, and therefore the DASH server may include "3gpp-access-position: 110000" in the response. Finally, the fourth byte range available to the DASH server (201515-229566) may not contain the start of any access position, and as a result the DASH server may not include "3gpp-access-position" element in the response. The following shows an example in pseudo code of such a response that might be received by the DASH client:

HTTP/1.1 200 OK
...
Content-Length: 172441
Content-Type: application/3gpp-partial; boundary=SEPARATION_STRING
Cache-Control: no-cache
-- SEPARATION_STRING
Content-type video/mp4

-continued

Figure 13:
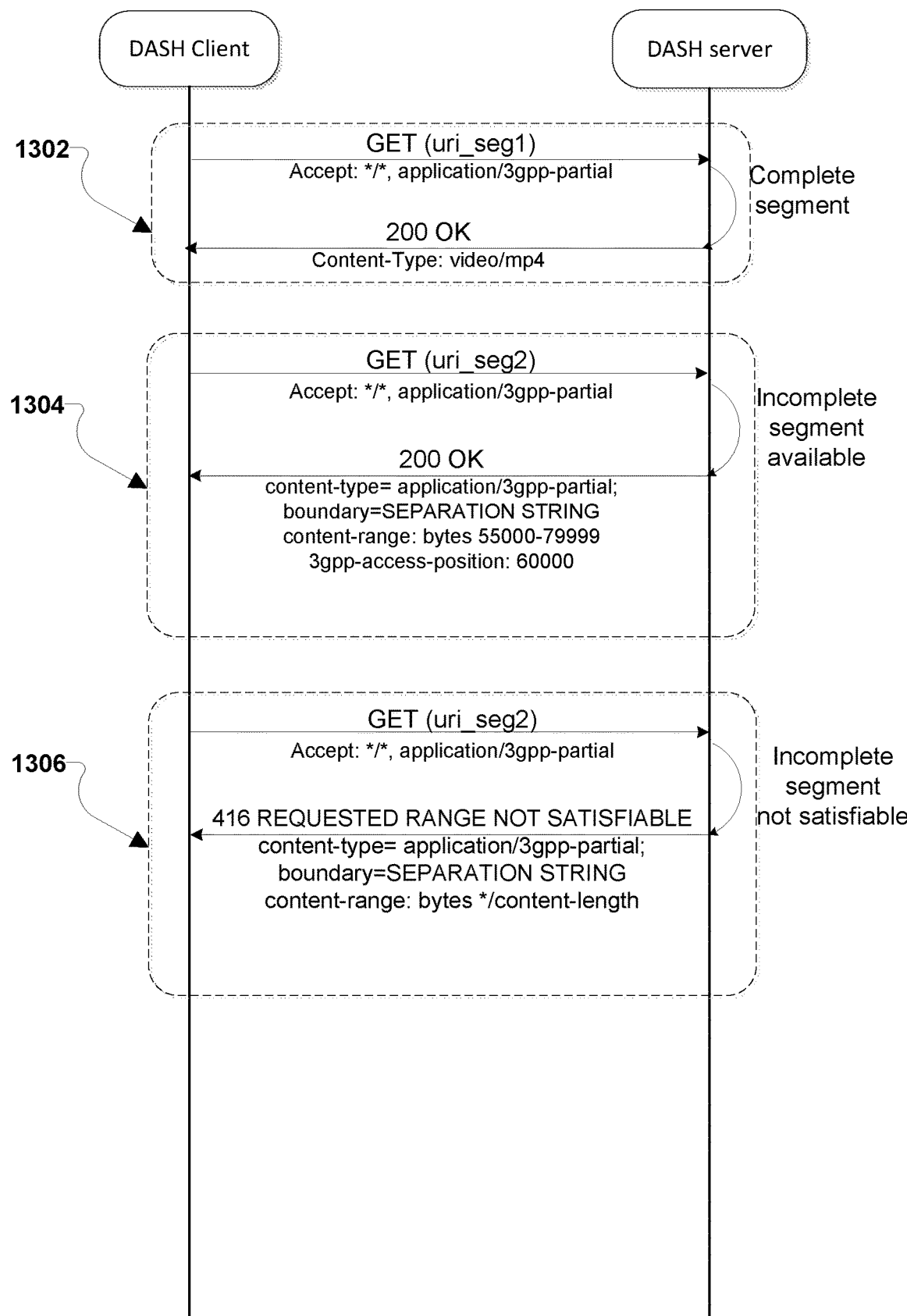
FIG. 13 is a call flow diagram illustrating interactions between a DASH client and DASH server according to various embodiments.

Content-range: bytes 0-19999/256000
3gpp-access-position: 0
...<the first range>...
-- SEPARATION_STRING
Content-type video/mp4
Content-range: bytes 50000-85000/256000
3gpp-access-position: 60000,80000
...<the second range>...
-- SEPARATION_STRING
Content-type: video/mp4
Content-range: bytes 105500-199888/256000
3gpp-access-position: 110000
...<the third range >...
-- SEPARATION_STRING
Content-type: video/mp4
Content-range: bytes 201515-229566/256000
...<the fourth range>...
-- SEPARATION_STRING FIG. 13 is a call flow diagram illustrating interactions between a DASH client and a DASH server according to various embodiments in which the DASH client may generate a segment request. The segment request may include, as an Accept header field described in RFC 7231, an indication that the client is capable of using an incomplete version of a segment. For example, a GET operation with the Accept header field indication "application/3gpp-partial" may indicate that the DASH client will accept partial segments in response to the segment request.

For example, in call series 1302, the DASH client may send a GET with the Accept header field indication "application/3gpp-partial," and because the full segment is available at the DASH server, a 200 response with the full segment may be returned.

In call series 1304 the DASH client may send a GET with the Accept header field indication "application/3gpp-partial." If only a portion of the segment is available at the DASH server and the Accept header indicates that the DASH client is capable of using a partial segment, the DASH server may determine that the DASH client is partial segment capable, and may send to the DASH client a 200 response with the partial segment, the partial segment content type header field indication "application/3gpp-partial", and the access position indication header field "3gpp-access-position."

In call series 1306 the DASH client may send a GET with the Accept header field indication "application/3gpp-partial." If no bytes of the segment may be available at the DASH server and the Accept header indicates that the DASH client is capable of using a partial segment, the DASH server may determine the DASH client is partial segment capable, and send to the DASH client a 416 "Requested Range Not Satisfiable" error message with content type header field indication "application/3gpp-partial", and the content-range "bytes */content-length."

Figure 14:
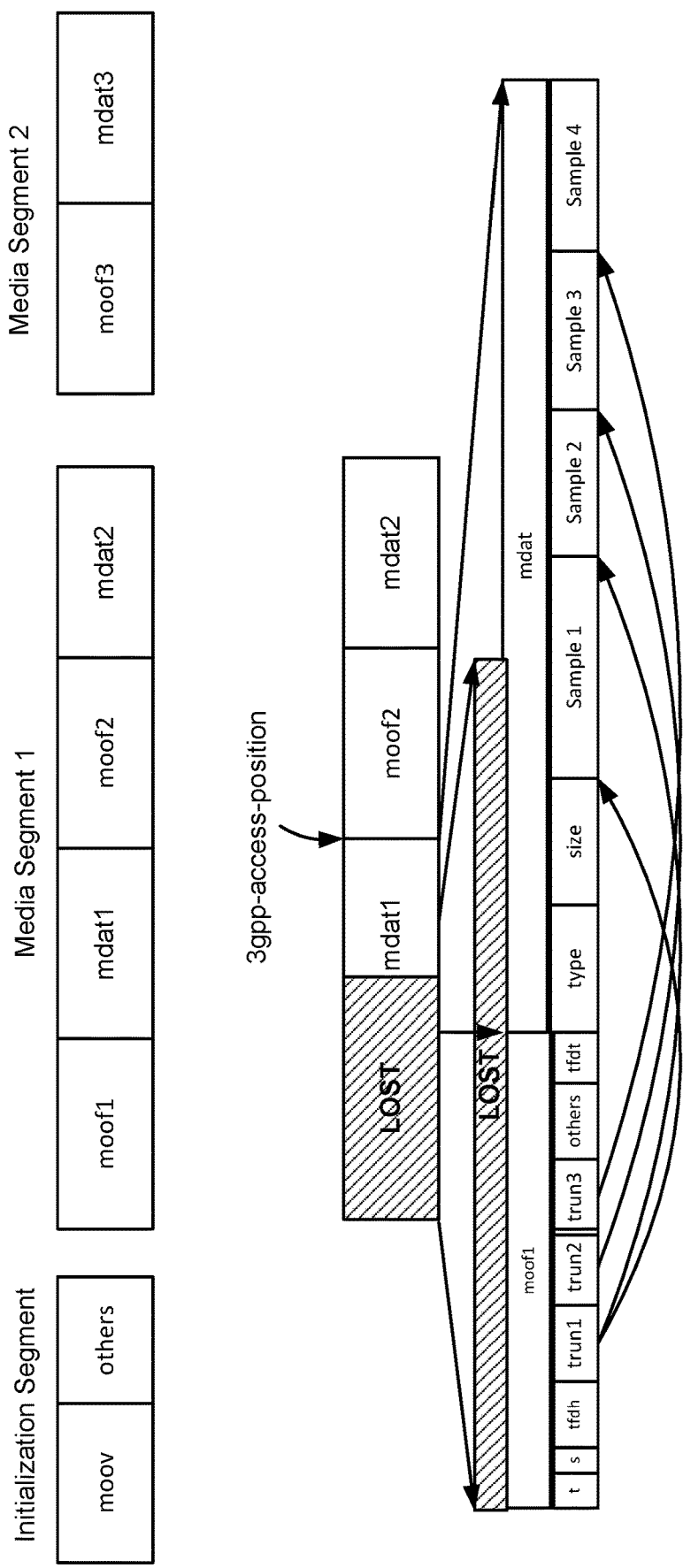
FIG. 14 is a data block diagram of segments of a media stream.

FIG. 14 is a data block diagram of segments of a media stream, such as a DASH media stream. A media stream may include an initialization segment and various media segments, such as media segment 1, media segment 2, etc. A media segment may include one or more moofs including metadata, such as data indicating random access points (e.g., Stream Access Points (SAPs) type 1 or 2) or sync samples, that may be used by a DASH client to decode and/or render the one or more media data portions (mdats) of the media segment (e.g., the byte ranges of the media segment including the video, audio, etc. data samples). In the various embodiments, the initial portion of the media segment may be the byte range of the media segment corresponding to the first moof of the segment.

Without the first moof of the media segment, the mdats of the segment may not be parsable and the starting position of any additional moofs in the segment may not be located by the DASH client because the size of the moof and mdat may be unknown to the DASH client. The various embodiments may provide an access position indication (e.g., indicated by the attribute "3gpp-access-position") that may identify a byte position in the media segment at which the DASH client may access the segment to begin parsing an incomplete version of the segment to identify random access points (e.g., Stream Access Points (SAPs) type 1 or 2) or sync samples that may be used to decode and/or render the incomplete version of the segment. In this manner, the access position may be an intermediate byte position in the requested byte range or requested segment that may enable the DASH client to parse an incomplete version of the segment when the initial portion of the segment (e.g., the first moof of the segment) may be lost.

For example, as illustrated in FIG. 14, moof1 and a portion of mdat1 for media segment 1 may be lost in transmission resulting in the DASH server only providing the incomplete version of media segment 1 to a requesting DASH client. By indicating that the incomplete version of media segment 1 is provided and indicating the access point byte position in the element "3gpp-access-position," the DASH client may determine whether the incomplete version includes the initial portion (e.g., moof 1). In response to determining that the initial portion of the segment (e.g., moof 1) is lost and not in the incomplete version, the DASH client may start parsing at the access position. In this manner, the meta data in moof 2, such as data indicating random access points (e.g., Stream Access Points (SAPs) type 1 or 2) or sync samples, may enable the DASH client to decode and/or render mdat2 and later media segments, such as media segment 2.

Figure 15:
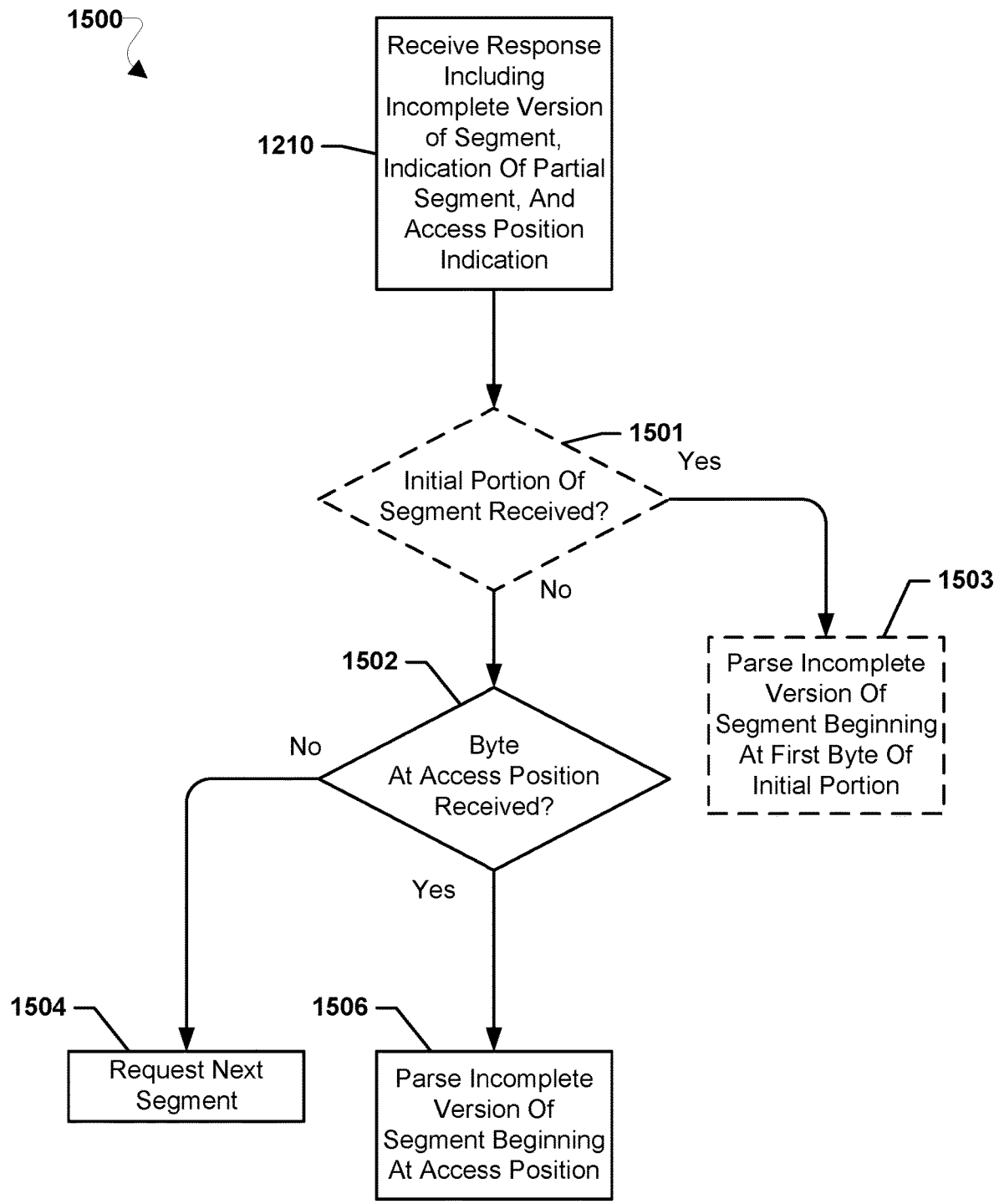
FIG. 15 is a process flow diagram illustrating an embodiment method for DASH client handling of incomplete versions of segments.

FIG. 15 illustrates an embodiment method 1500 for a DASH client handling of incomplete versions of segments. In an embodiment, the operations of the method 1500 may be performed by a DASH client to parse an incomplete response to a media file request. As discussed above, in block 1210 the DASH client may receive the response including the incomplete version of a segment, the indication that the response includes a partial segment, and the indication of the one or more access points. For example, the response may include "application/3gpp-partial" as Content-Type indicating that the segment is a partial segment and the extension header fields "3gpp-access-position" indicating one or more byte positions in the DASH segment at which the DASH client may access the segment.

In optional determination block 1501 the DASH client may determine whether an initial portion of the segment was received in the incomplete response. In the various embodiments, the initial portion of the media segment may be the byte range of the media segment corresponding to the first moof of the segment. In response to determining the initial portion of the segment is received (i.e., determination block 1501="Yes"), the DASH client may parse the incomplete version of the segment beginning at the first byte of the initial portion in block 1503.

In response to determining that the initial portion of the segment is not received (i.e., determination block 1501="No") or in embodiments in which the DASH client may not be configured to check for an initial portion, the DASH client may determine whether a byte at the access position is received in the incomplete version of the segment in determination block 1502. In response to determining that the byte corresponding to the access position is not received (i.e., determination block 1502="No"), the DASH client may request the next segment in the representation in block 1504. In response to determining that the byte corresponding to the access position is received (i.e., determination block 1502="Yes"), the DASH client may parse the incomplete version of the segment beginning at the access position in block 1506.

Figure 16:
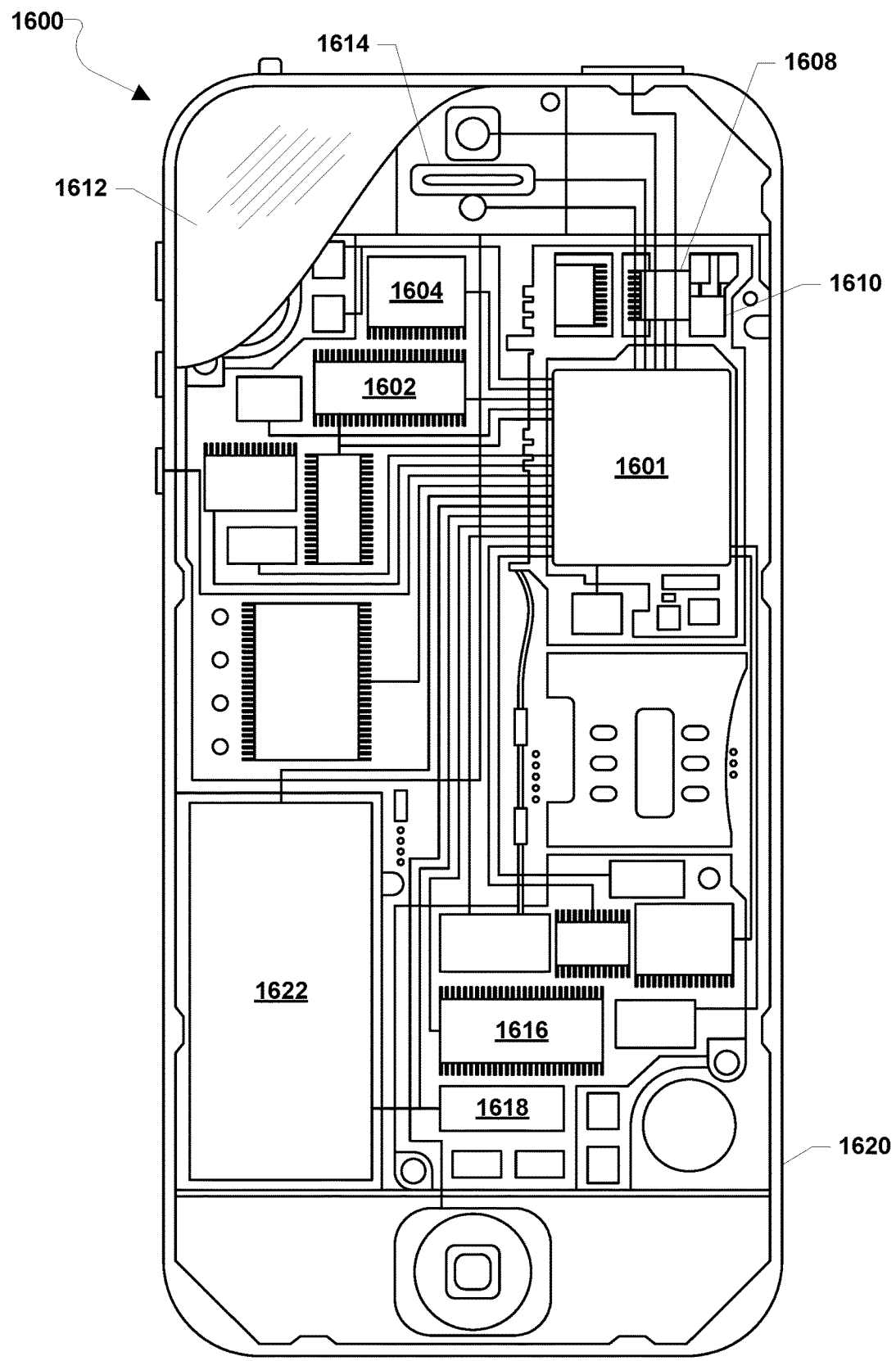
FIG. 16 is a component diagram of an example computing device suitable for use with the various embodiments.

The various embodiments (including, but not limited to, embodiments discussed above with reference to FIGS. 4-15) may be implemented in any of a variety of mobile devices (i.e., receiver devices), an example of which is illustrated in FIG. 16. For example, the mobile computing device 1600 may include a processor 1601 coupled to a touch screen controller 1604 and an internal memory 1602. The processor 1601 may be one or more multicore integrated circuits (ICs) designated for general or specific processing tasks. The internal memory 1602 may be volatile or non-volatile memory, and may also be secure and/or encrypted memory, or unsecure and/or unencrypted memory, or any combination thereof. The touch screen controller 1604 and the processor 1601 may also be coupled to a touch screen panel 1612, such as a resistive-sensing touch screen, capacitive-sensing touch screen, infrared sensing touch screen, etc. The mobile computing device 1600 may have one or more radio signal transceivers 1608 (e.g., Peanut®, Bluetooth®, Zigbee®, Wi-Fi, cellular, etc.) and antennae 1610, for sending and receiving, coupled to each other and/or to the processor 1601. The transceivers 1608 and antennae 1610 may be used with the above-mentioned circuitry to implement the various wireless transmission protocol stacks and interfaces. The mobile computing device 1600 may include a cellular network wireless modem chip 1616 that enables communication via a cellular network and is coupled to the processor. The mobile computing device 1600 may include a peripheral device connection interface 1618 coupled to the processor 1601. The peripheral device connection interface 1618 may be singularly configured to accept one type of connection, or multiply configured to accept various types of physical and communication connections, common or proprietary, such as USB, FireWire, Thunderbolt, or PCIe. The peripheral device connection interface 1618 may also be coupled to a similarly configured peripheral device connection port (not shown). The mobile computing device 1600 may also include speakers 1614 for providing audio outputs. The mobile computing device 1600 may also include a housing 1620, constructed of a plastic, metal, or a combination of materials, for containing all or some of the components discussed herein. The mobile computing device 1600 may include a power source 1622 coupled to the processor 1601, such as a disposable or rechargeable battery. The rechargeable battery may also be coupled to the peripheral device connection port to receive a charging current from a source external to the mobile computing device 1600.

Figure 17:
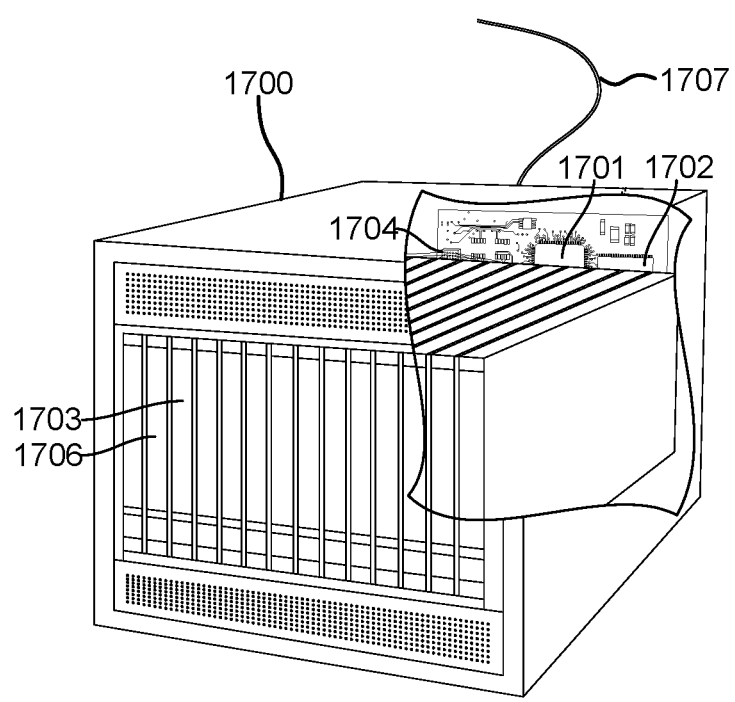
FIG. 17 is a component diagram of an example server suitable for use with the various embodiments.

The various embodiments (including, but not limited to, embodiments discussed above with reference to FIGS. 4-15) may also be implemented on any of a variety of commercially available server devices, such as the server 1700 illustrated in FIG. 17. Such a server 1700 typically includes a processor 1701 coupled to volatile memory 1702 and a large capacity nonvolatile memory, such as a disk drive 1704. The server 1700 may also include a floppy disc drive, compact disc (CD) or DVD disc drive 1706 coupled to the processor 1701. The server 1700 may also include one or more network transceivers 1703, such as a network access port, coupled to the processor 1701 for establishing network interface connections with a communication network 1707, such as a local area network coupled to other announcement system computers and servers, the Internet, the public switched telephone network, and/or a cellular network (e.g., CDMA, TDMA, GSM, PCS, 3G, 4G, LTE, or any other type of cellular network).

The processors 1601 and 1701 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 1601 and 1701. The processors 1601 and 1701 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1601 and 1701 including internal memory or removable memory plugged into the device and memory within the processors 1601 and 1701 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for parsing an incomplete version of a media file, comprising:
   transmitting a first media file request;
   receiving a first response message to the first media file request that indicates that the incomplete version of the requested media file is available;
   transmitting a second media file request in response to receiving the first response message to the first media file request that indicates that the incomplete version of the requested media file is available;
   receiving the incomplete version of the requested media file in a second response message associated with second media file request, the second response message including both an indication that the second response message includes the incomplete version of the requested media file and an indication of an access position for the incomplete version of the requested media file, wherein the access position identifies a byte at which to begin parsing the incomplete version of the requested media file to decode the incomplete version of the requested media file, and wherein the indication that the second response message includes the incomplete version of the requested media file is a content type indication, which indicates both the content type and partial status of the media file, and corresponds at least in part to an Accept header field indication in the second media file request;

determining whether the byte corresponding to the access position is received in the incomplete version of the requested media file; and parsing the incomplete version of the requested media file beginning at the byte corresponding to the access position in response to determining that the byte corresponding to the access position is received in the incomplete version of the requested media file.

2. The method of claim 1, further comprising:

determining whether an initial portion of a media file associated with the second media file request is received in the incomplete version of the requested media file, wherein parsing the incomplete version of the requested media file beginning at the byte corresponding to the access position in response to determining that the byte corresponding to the access position is received in the incomplete version of the requested media file comprises parsing the incomplete version of the requested media file beginning at the byte corresponding to the access position in response to determining that the initial portion of the media file is not received in the incomplete version of the requested media file and determining that the byte corresponding to the access position is received in the incomplete version of the requested media file.

3. The method of claim 1, wherein the access position is an intermediate byte position in a byte range of the media file associated with the second media file request.

4. The method of claim 1, wherein the initial portion of the media file associated with the second media file request is a first movie fragment header of the media file associated with the second media file request.

5. The method of claim 1, wherein the media file is part of a DASH media stream.

6. A computing device, comprising:

a processor configured with processor-executable instructions to perform operations comprising:

transmitting a first media file request;

receiving a first response message to the first media file request that indicates that an incomplete version of a requested media file is available;

transmitting a second media file request in response to receiving the first response message to the first media file request that indicates that the incomplete version of the requested media file is available;

receiving the incomplete version of the requested media file in a second response message associated with second media file request, the second response message including both an indication that the second response message includes the incomplete version of the requested media file and an indication of an access position for the incomplete version of the requested media file, wherein the access position identifies a byte at which to begin parsing the incomplete version of the requested media file to decode the incomplete version of the requested media file, and wherein the indication that the second response message includes the incomplete version of the requested media file is a content type indication, which indicates both the content type and partial status of the media file, and corresponds at least in part to an Accept header field indication in the second media file request;

determining whether the byte corresponding to the access position is received in the incomplete version of the requested media file; and parsing the incomplete version of the requested media file beginning at the byte corresponding to the access position in response to determining that the byte corresponding to the access position is received in the incomplete version of the requested media file.

7. The computing device of claim 6, wherein the processor is configured with processor-executable instructions to perform operations further comprising:

determining whether an initial portion of a media file associated with the second media file request is received in the incomplete version of the requested media file, wherein parsing the incomplete version of the requested media file beginning at the byte corresponding to the access position in response to determining that the byte corresponding to the access position is received in the incomplete version of the requested media file comprises parsing the incomplete version of the requested media file beginning at the byte corresponding to the access position in response to determining that the initial portion of the media file is not received in the incomplete version of the requested media file and determining that the byte corresponding to the access position is received in the incomplete version of the requested media file.

8. The computing device of claim 6, wherein the access position is an intermediate byte position in a byte range of the media file associated with the second media file request.

9. The computing device of claim 7, wherein the initial portion of the media file associated with the second media file request is a first movie fragment header of the media file associated with the second media file request.

10. The computing device of claim 6, wherein the media file is part of a DASH media stream.

11. A computing device, comprising:

means for transmitting a first media file request;

means for receiving a first response message to the first media file request that indicates that an incomplete version of a requested media file is available;

means for transmitting a second media file request in response to receiving the first response message to the first media file request that indicates that the incomplete version of the requested media file is available;

means for receiving the incomplete version of the requested media file in a second response message associated with second media file request, the second response message including both an indication that the second response message includes the incomplete version of the requested media file and an indication of an access position for the incomplete version of the requested media file, wherein the access position identifies a byte at which to begin parsing the incomplete version of the requested media file to decode the incomplete version of the requested media file, and wherein the indication that the second response message includes the incomplete version of the requested media file is a content type indication, which indicates both the content type and partial status of the media file, and corresponds at least in part to an Accept header field indication in the second media file request;

means for determining whether the byte corresponding to the access position is received in the incomplete version of the requested media file; and means for parsing the incomplete version of the requested media file beginning at the byte corresponding to the access position in response to determining that the byte corresponding to the access position is received in the incomplete version of the requested media file.

12. The computing device of claim 11, further comprising means for determining whether an initial portion of a media file associated with the second media file request is received in the incomplete version of the requested media file, wherein means for parsing the incomplete version of the requested media file beginning at the byte corresponding to the access position in response to determining that the byte corresponding to the access position is received in the incomplete version of the requested media file comprises means for parsing the incomplete version of the requested media file beginning at the byte corresponding to the access position in response to determining that the initial portion of the media file is not received in the incomplete version of the requested media file and determining that the byte corresponding to the access position is received in the incomplete version of the requested media file.

13. The computing device of claim 11, wherein the access position is an intermediate byte position in a byte range of the media file associated with the second media file request.

14. The computing device of claim 11, wherein the initial portion of the media file associated with the second media file request is a first movie fragment header of the media file associated with the second media file request.

15. The computing device of claim 11, wherein the media file is part of a DASH media stream.

16. A non-transitory processor-readable storage medium having stored thereon processor-executable instructions configured to cause a computing device processor to perform operations comprising:

transmitting a first media file request;

receiving a first response message to the first media file request that indicates that an incomplete version of a requested media file is available;

transmitting a second media file request in response to receiving the first response message to the first media file request that indicates that the incomplete version of the requested media file is available;

receiving the incomplete version of the requested media file in a second response message associated with second media file request, the second response message including both an indication that the second response message includes the incomplete version of the requested media file and an indication of an access position for the incomplete version of the requested media file, wherein the access position identifies a byte at which to begin parsing the incomplete version of the requested media file to decode the incomplete version of the requested media file, and wherein the indication that the second response message includes the incomplete version of the requested media file is a content type indication, which indicates both the content type and partial status of the media file, and corresponds at least in part to an Accept header field indication in the second media file request;

determining whether the byte corresponding to the access position is received in the incomplete version of the requested media file; and parsing the incomplete version of the requested media file beginning at the byte corresponding to the access position in response to determining that the byte corresponding to the access position is received in the incomplete version of the requested media file.

17. The non-transitory processor-readable storage medium of claim 16, wherein the stored processor-executable instructions are configured to cause the computing device processor to perform operations further comprising:

determining whether an initial portion of a media file associated with the second media file request is received in the incomplete version of the requested media file, and wherein the stored processor-executable instructions are configured to cause the computing device processor to perform operations such that parsing the incomplete version of the requested media file beginning at the byte corresponding to the access position in response to determining that the byte corresponding to the access position is received in the incomplete version of the requested media file comprises parsing the incomplete version of the requested media file beginning at the byte corresponding to the access position in response to determining that the initial portion of the media file is not received in the incomplete version of the requested media file and determining that the byte corresponding to the access position is received in the incomplete version of the requested media file.

18. The non-transitory processor-readable storage medium of claim 16, wherein the stored processor-executable instructions are configured to cause a computing device processor to perform operations such that the access position is an intermediate byte position in a byte range of the media file associated with the second media file request.

19. The non-transitory processor-readable storage medium of claim 16, wherein the stored processor-executable instructions are configured to cause a computing device processor to perform operations such that the initial portion of the media file associated with the second media file request is a first movie fragment header of the media file associated with the second media file request.

20. The non-transitory processor-readable storage medium of claim 16, wherein the stored processor-executable instructions are configured to cause a computing device processor to perform operations such that the media file is part of a DASH media stream.

* * * * *